INVENTOR.
LESLIE E. SODERQUIST
BY
ATTORNEYS

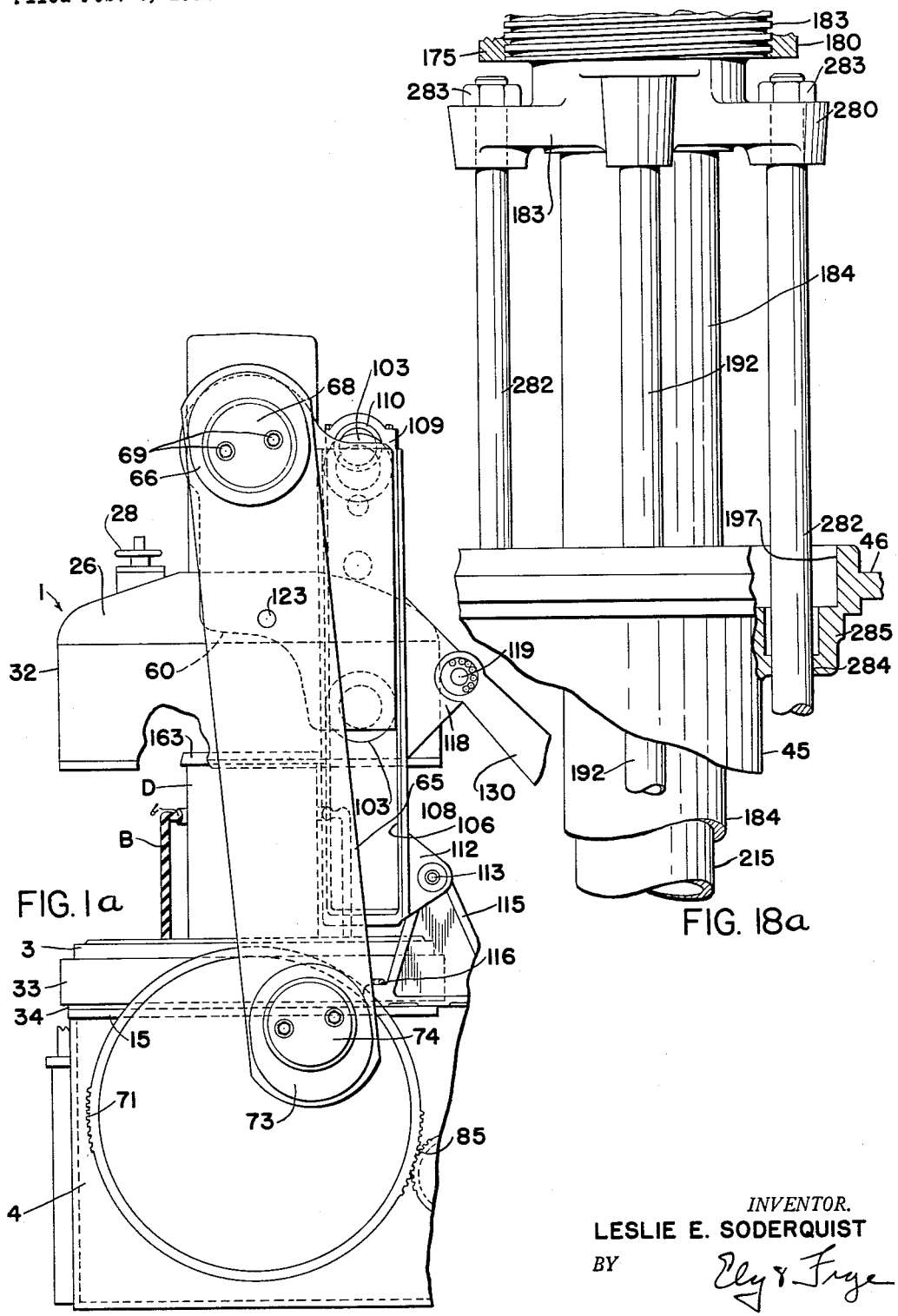

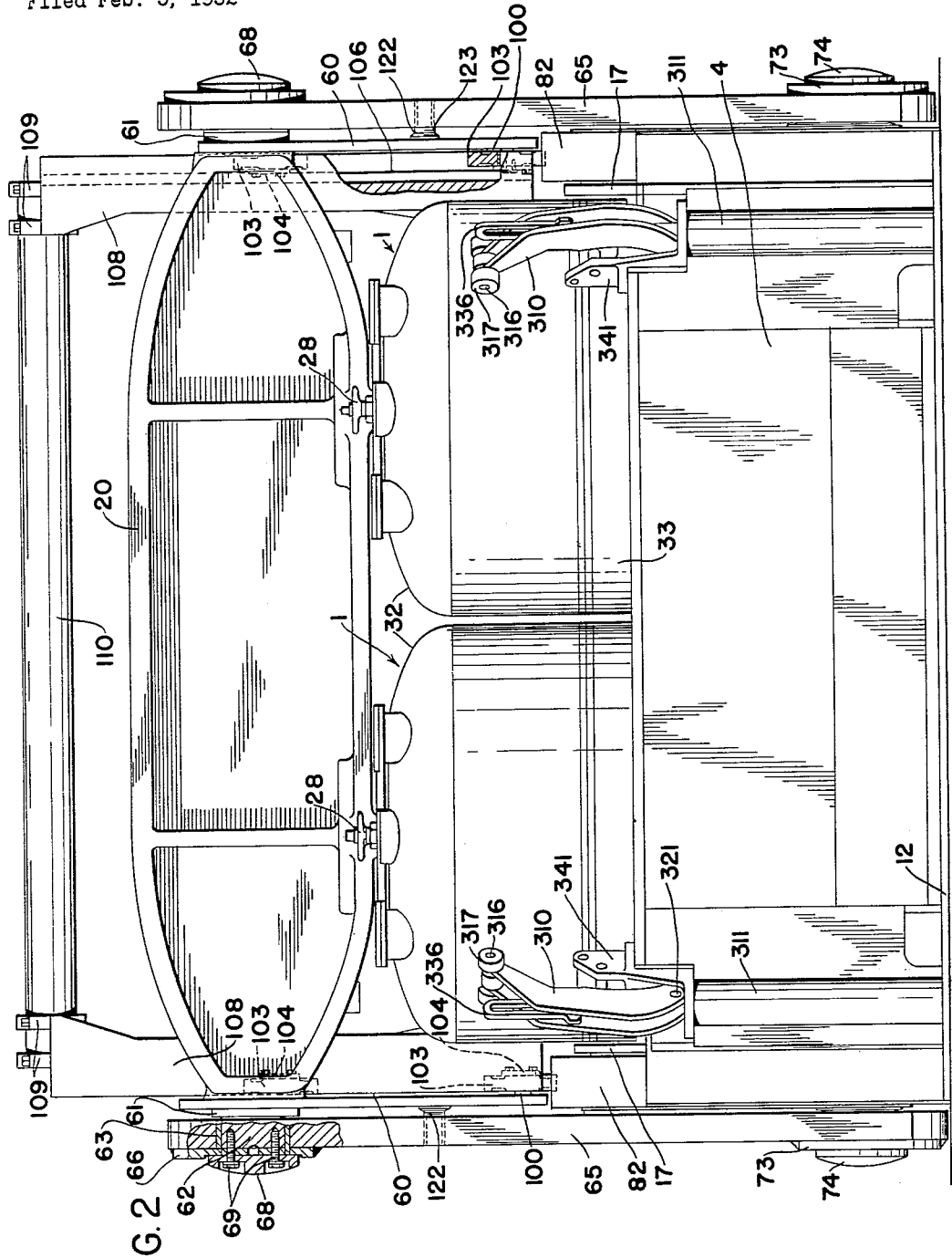

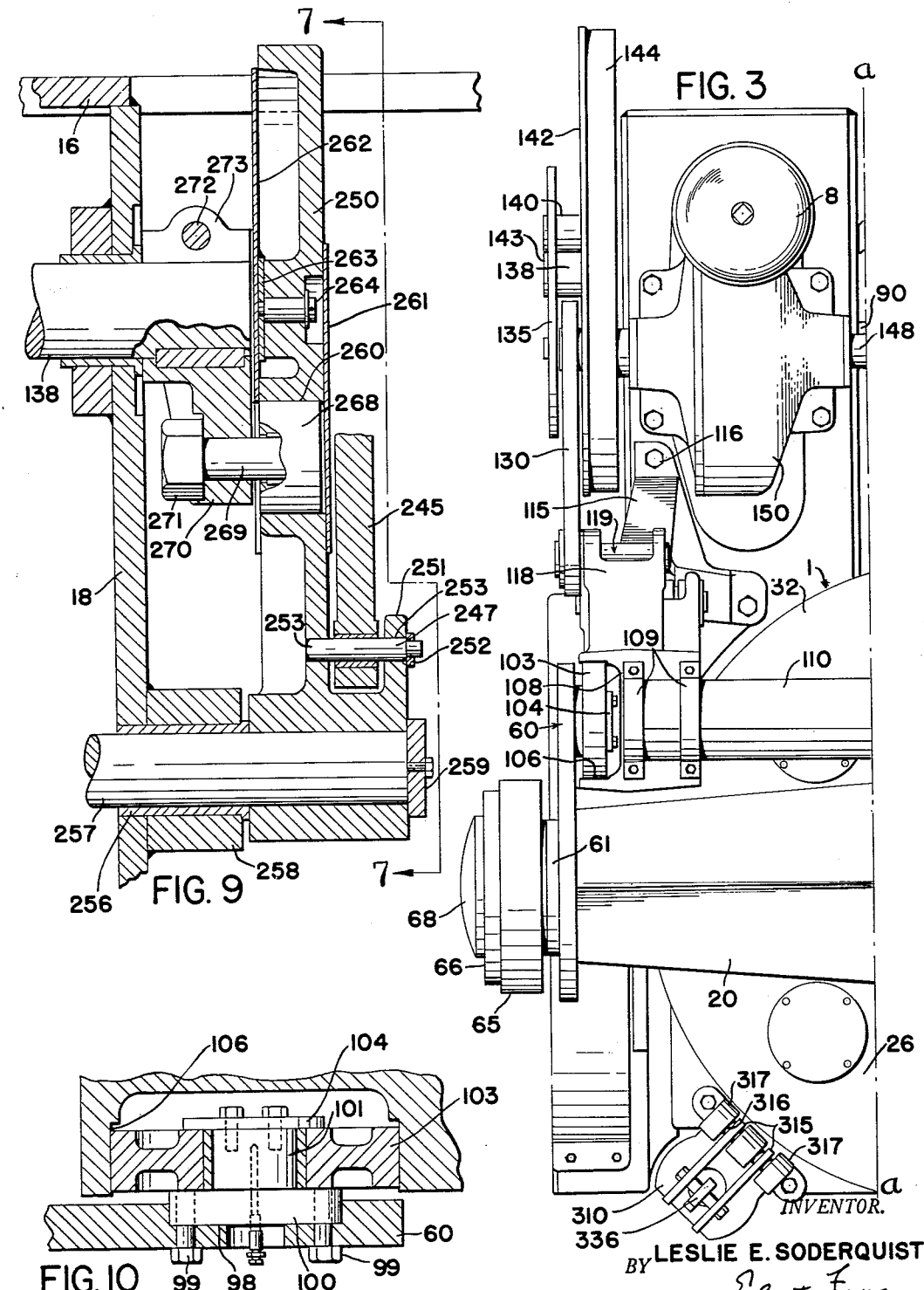

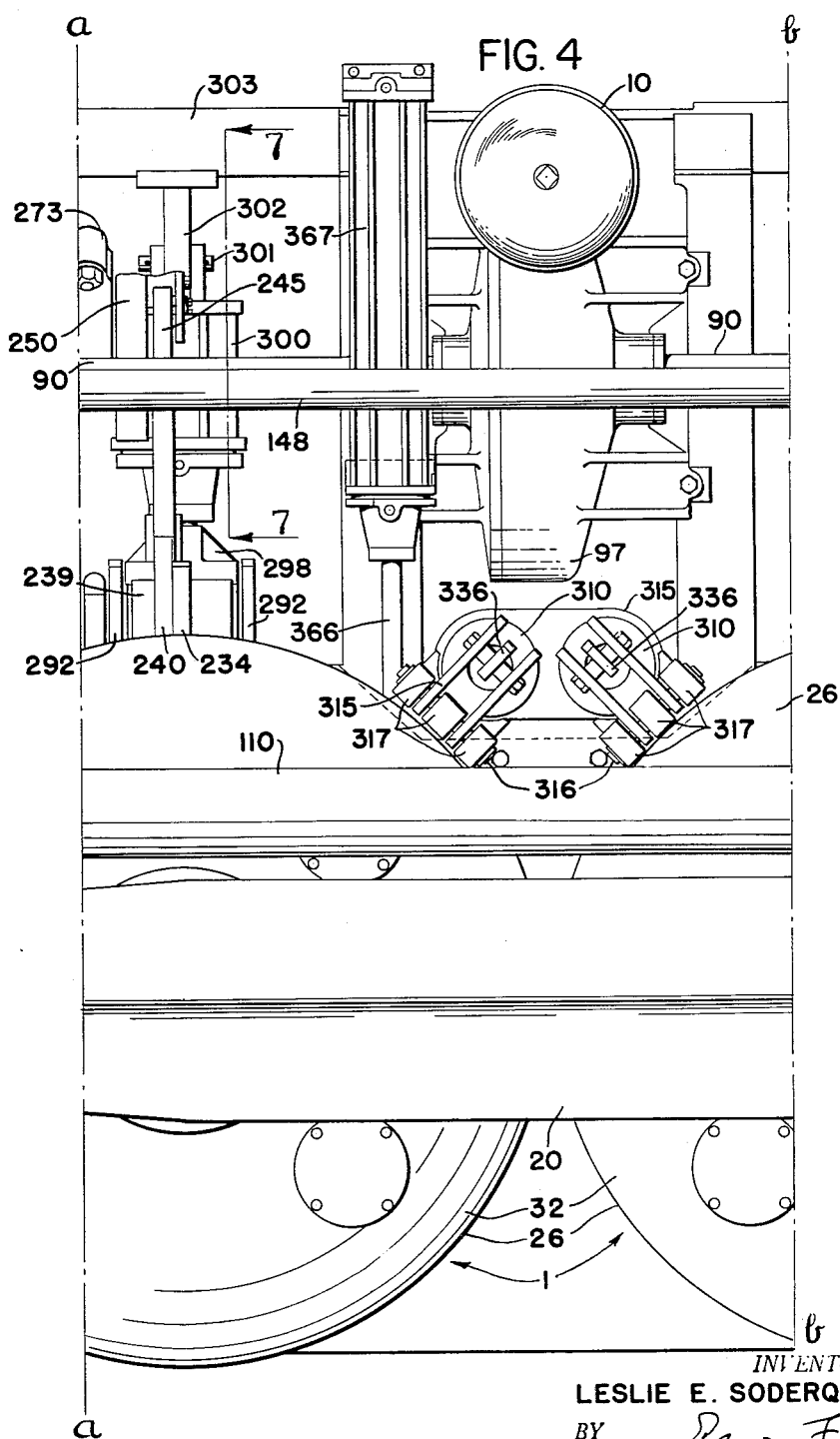

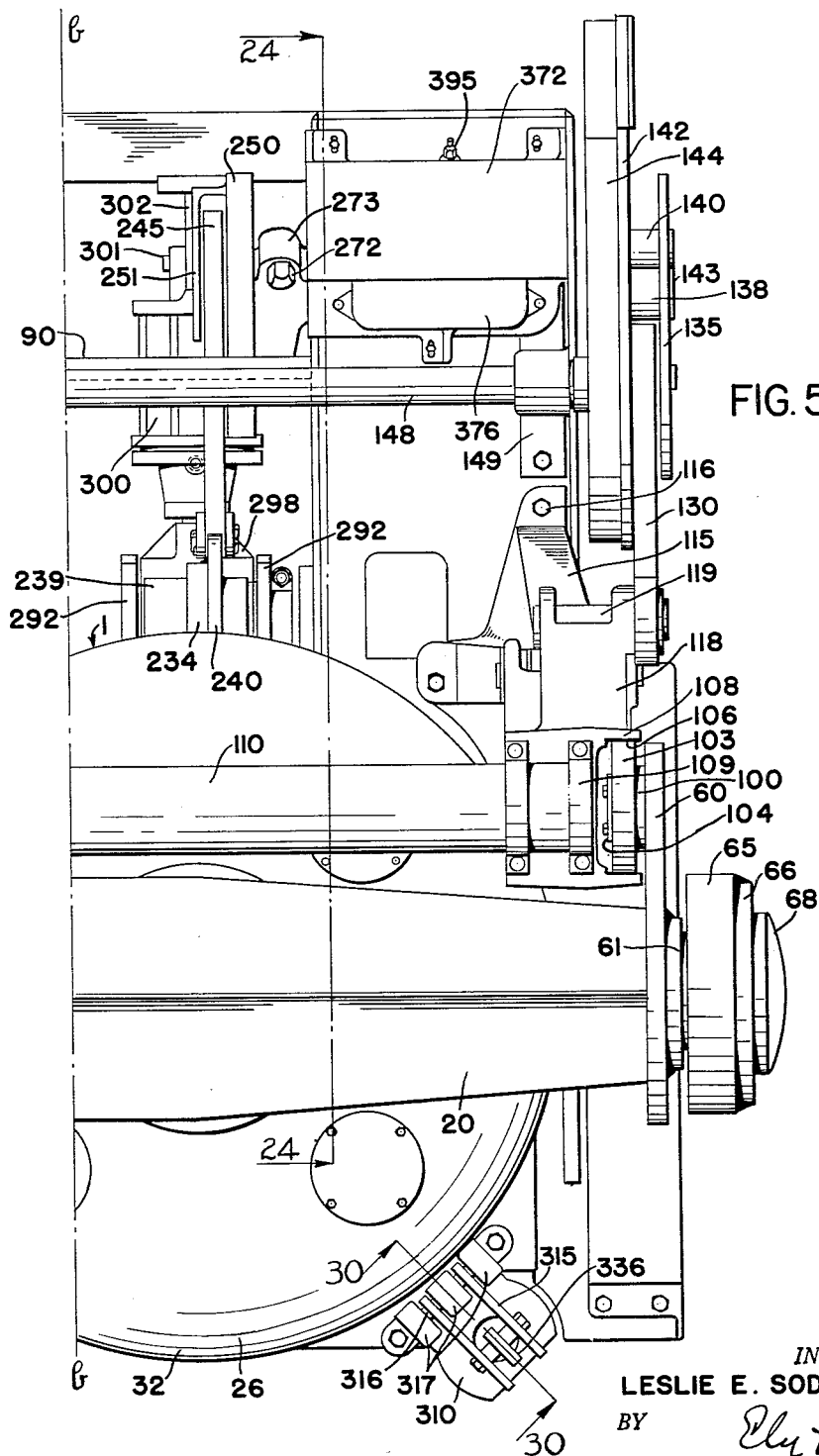

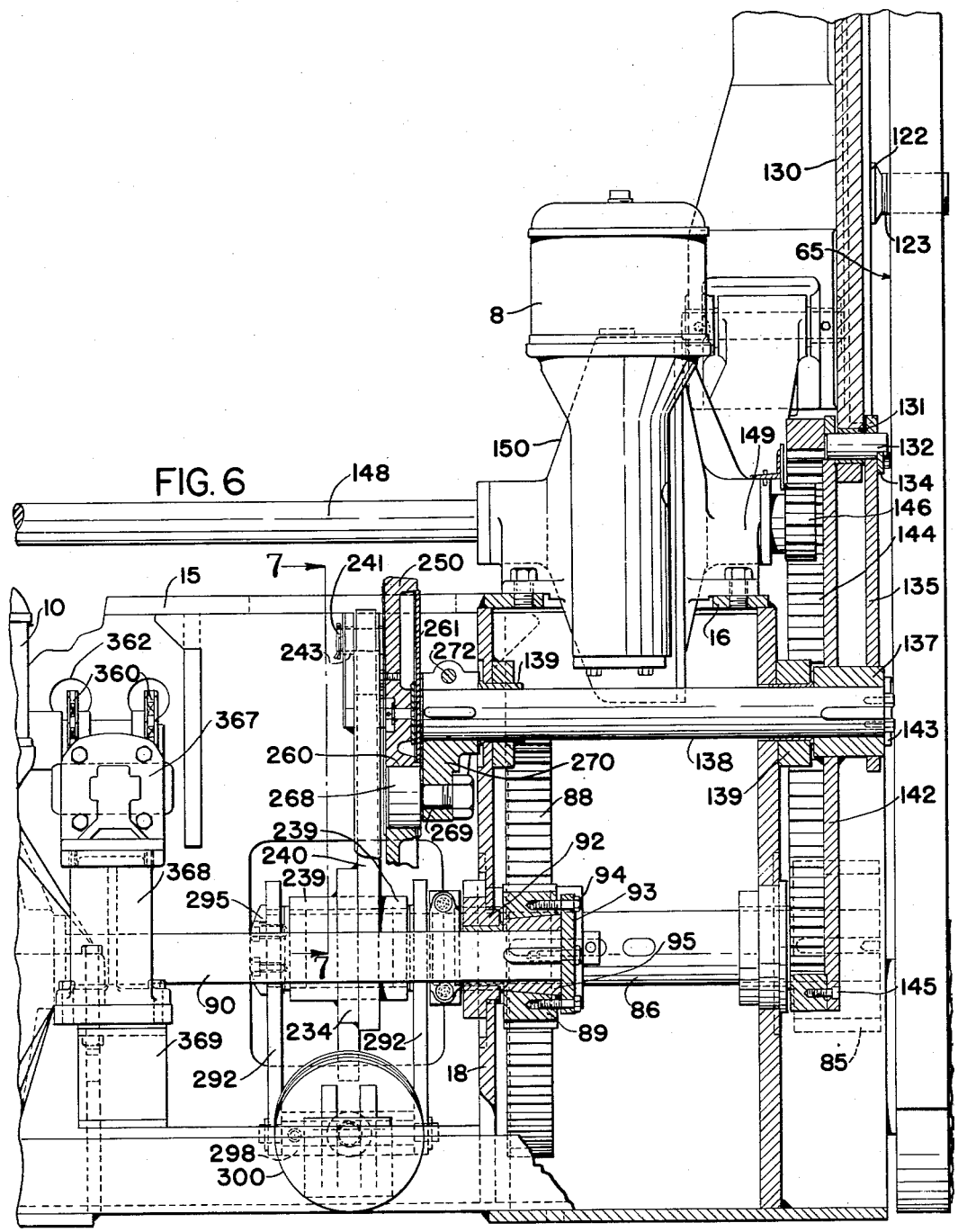

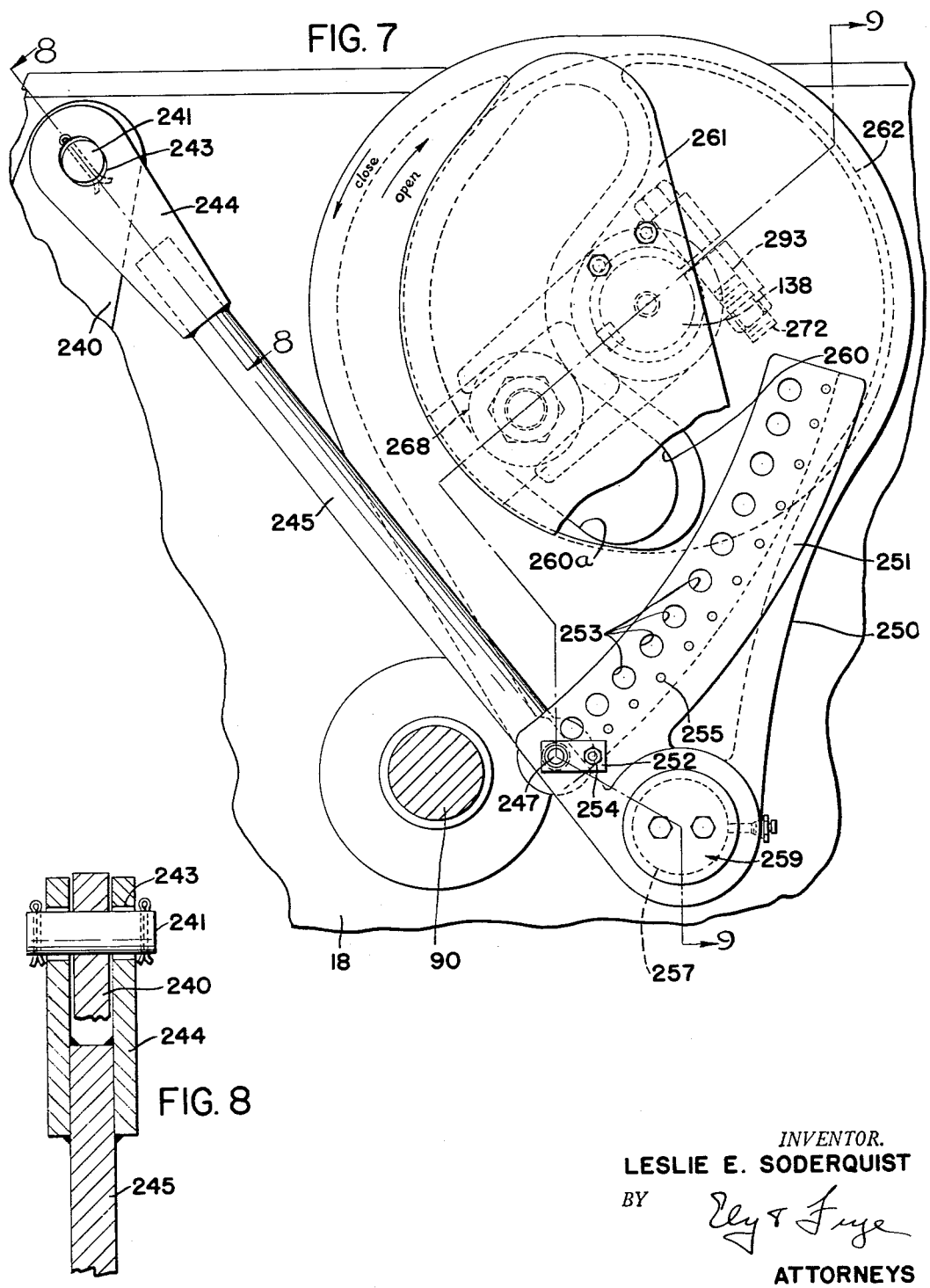

Aug. 16, 1955  L. E. SODERQUIST  2,715,245
PRESS FOR SHAPING AND CURING PNEUMATIC TIRES
Filed Feb. 5, 1952  18 Sheets-Sheet 9

*INVENTOR.*
LESLIE E. SODERQUIST
BY
*Ely & Frye*
ATTORNEYS

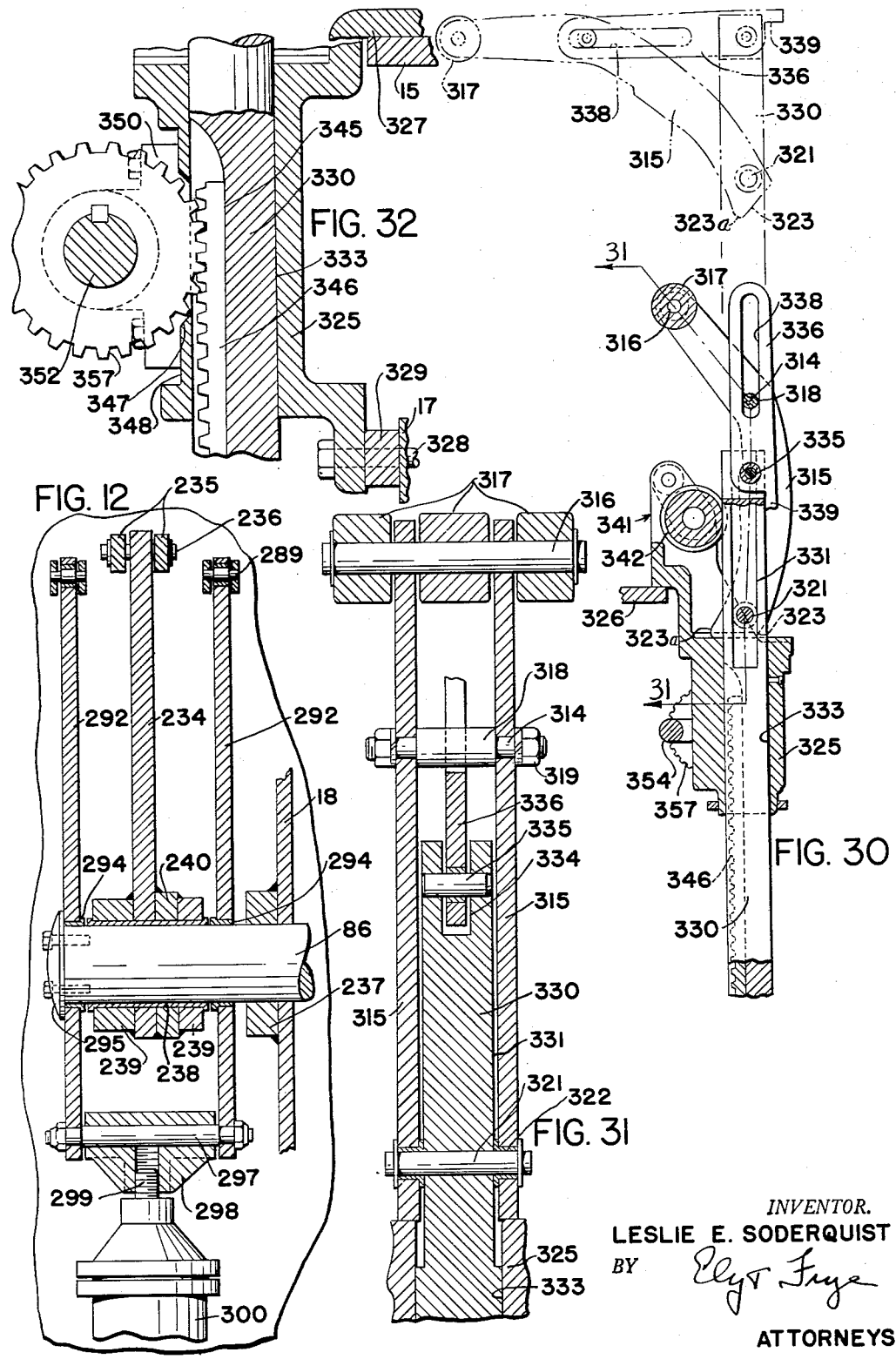

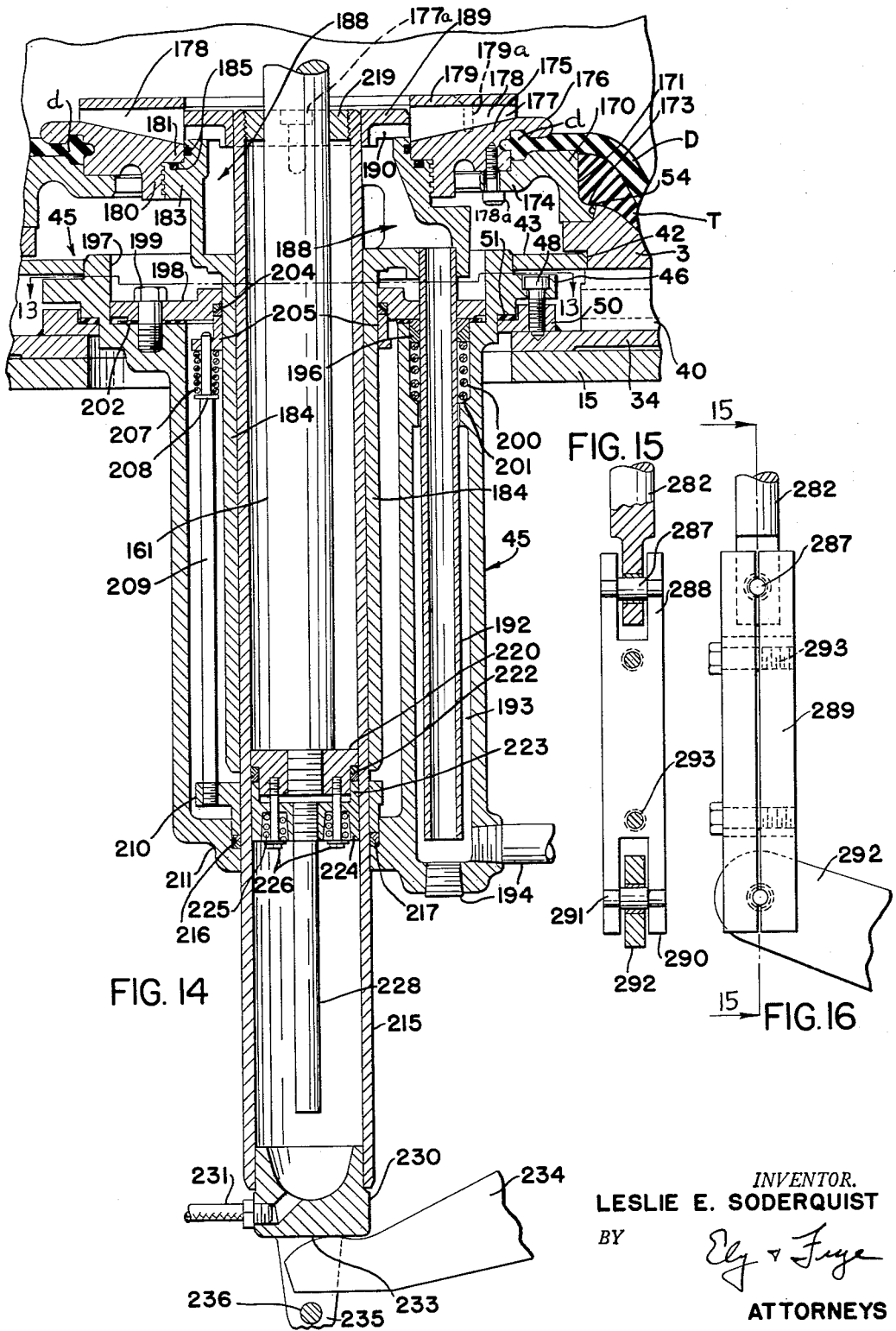

Aug. 16, 1955 L. E. SODERQUIST 2,715,245
PRESS FOR SHAPING AND CURING PNEUMATIC TIRES
Filed Feb. 5, 1952 18 Sheets-Sheet 12
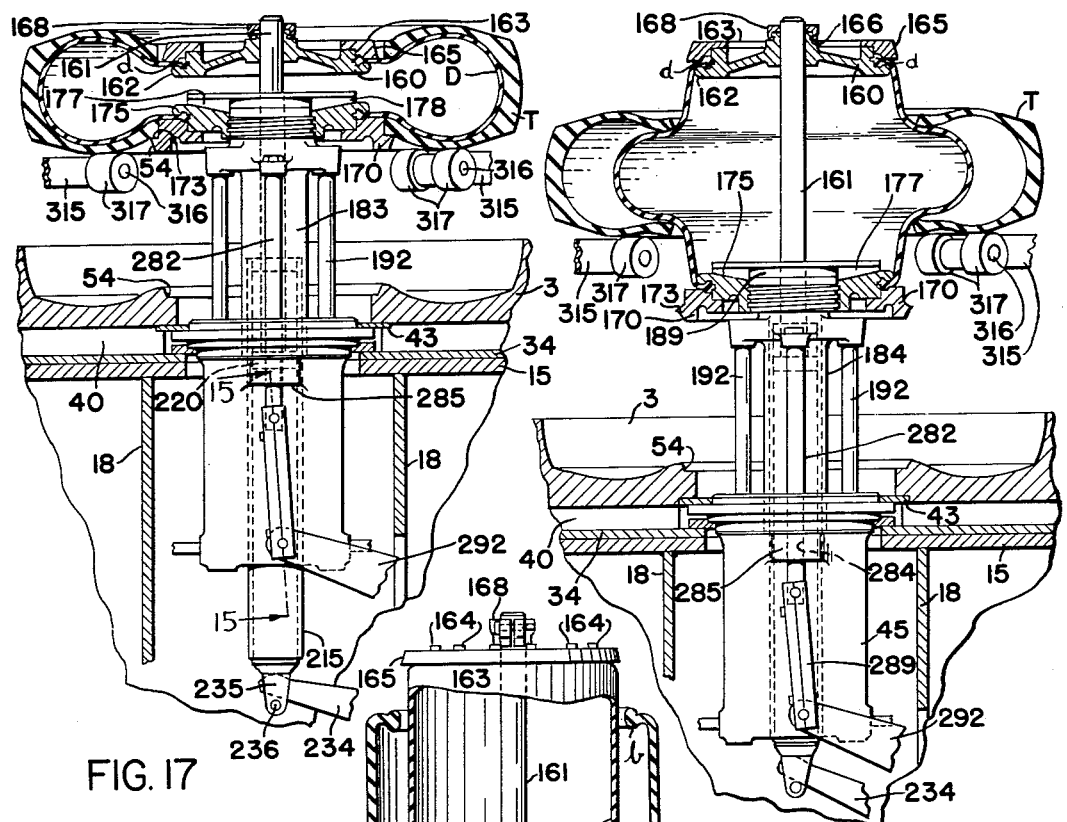
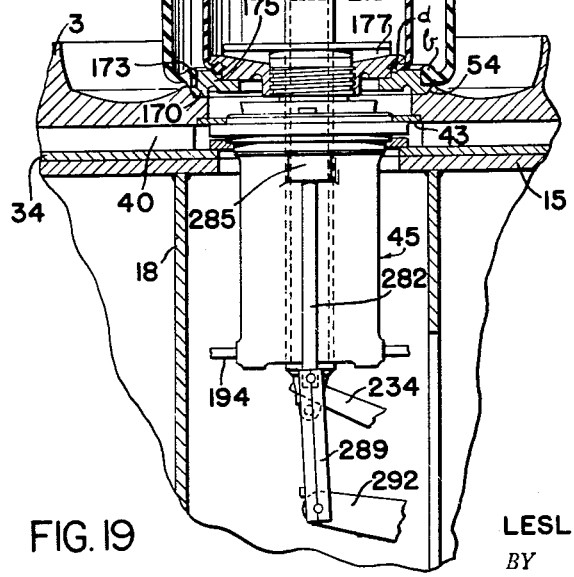
FIG. 17
FIG. 18
FIG. 19
INVENTOR.
LESLIE E. SODERQUIST
BY
ATTORNEYS Aug. 16, 1955   L. E. SODERQUIST   2,715,245
PRESS FOR SHAPING AND CURING PNEUMATIC TIRES
Filed Feb. 5, 1952   18 Sheets-Sheet 13
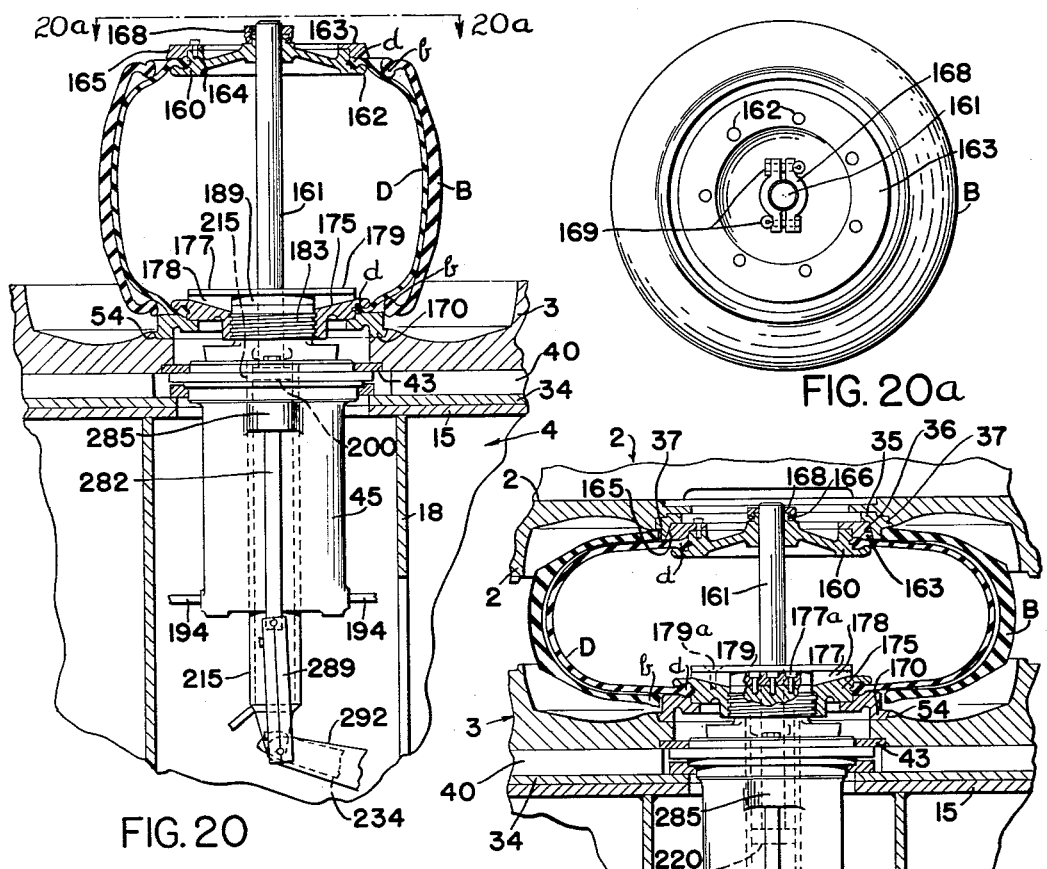
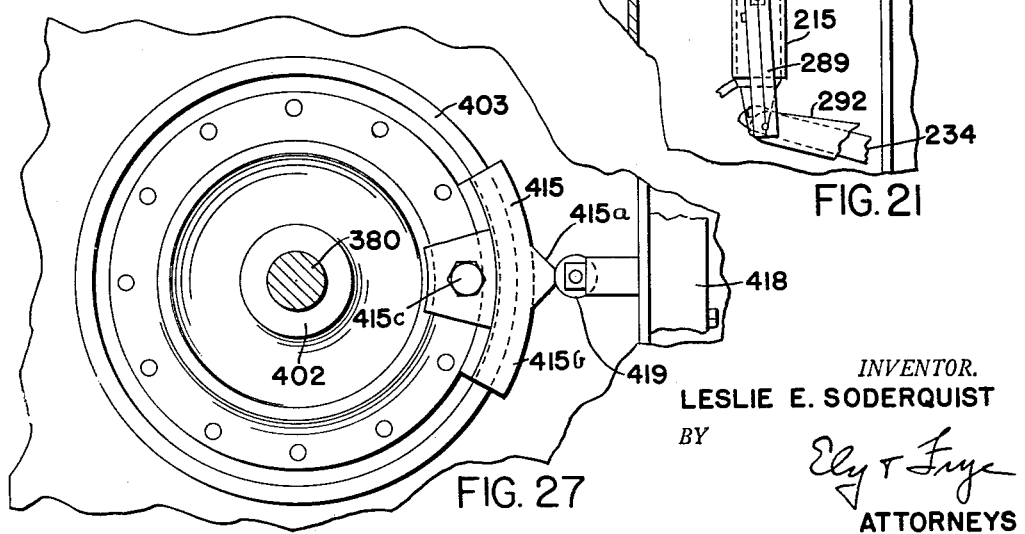
INVENTOR.
LESLIE E. SODERQUIST
BY
Ely & Frye
ATTORNEYS Aug. 16, 1955 L. E. SODERQUIST 2,715,245
PRESS FOR SHAPING AND CURING PNEUMATIC TIRES
Filed Feb. 5, 1952 18 Sheets-Sheet 14
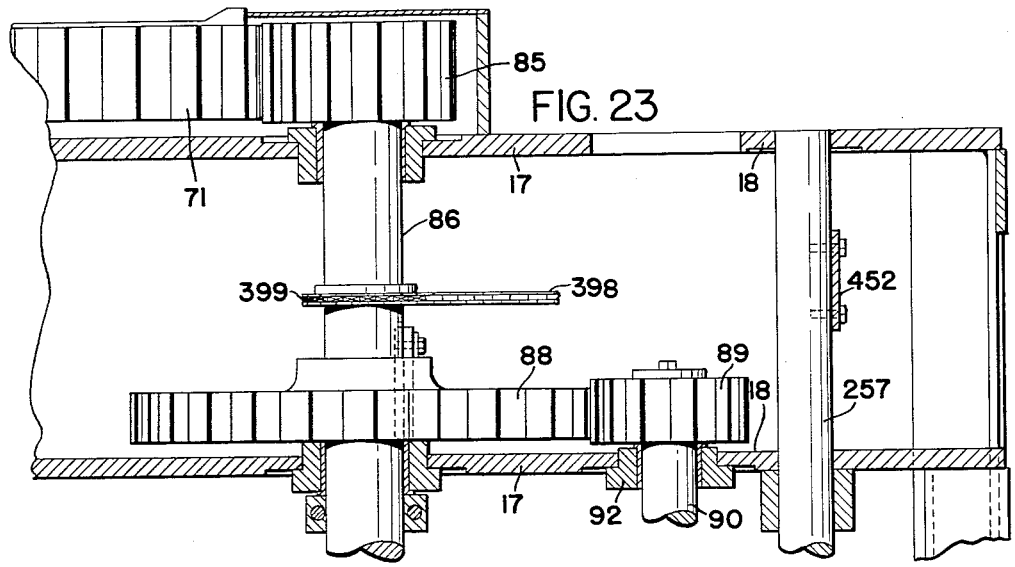
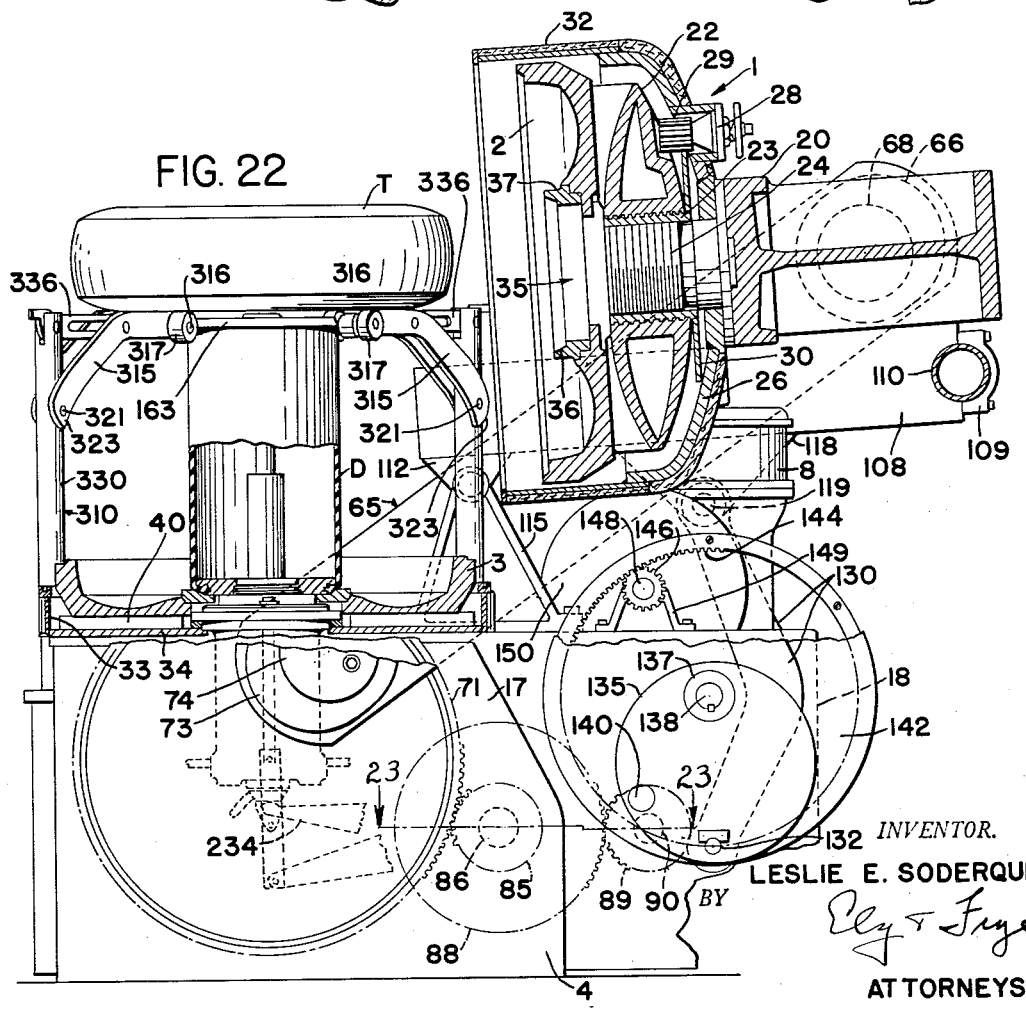
INVENTOR.
LESLIE E. SODERQUIST
BY
ATTORNEYS

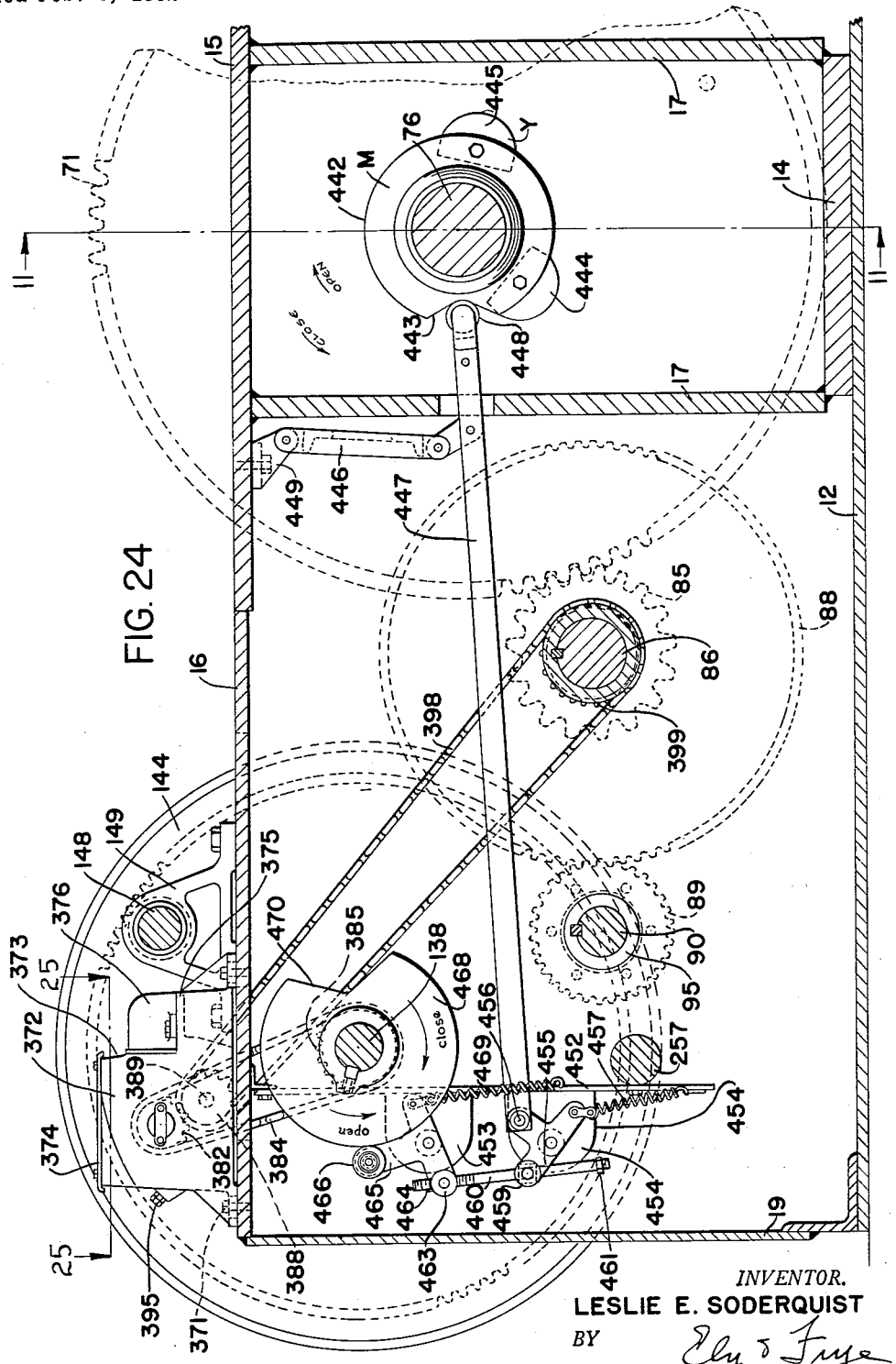

Aug. 16, 1955 L. E. SODERQUIST 2,715,245
PRESS FOR SHAPING AND CURING PNEUMATIC TIRES
Filed Feb. 5, 1952 18 Sheets-Sheet 16

INVENTOR.
LESLIE E. SODERQUIST
BY
ATTORNEYS

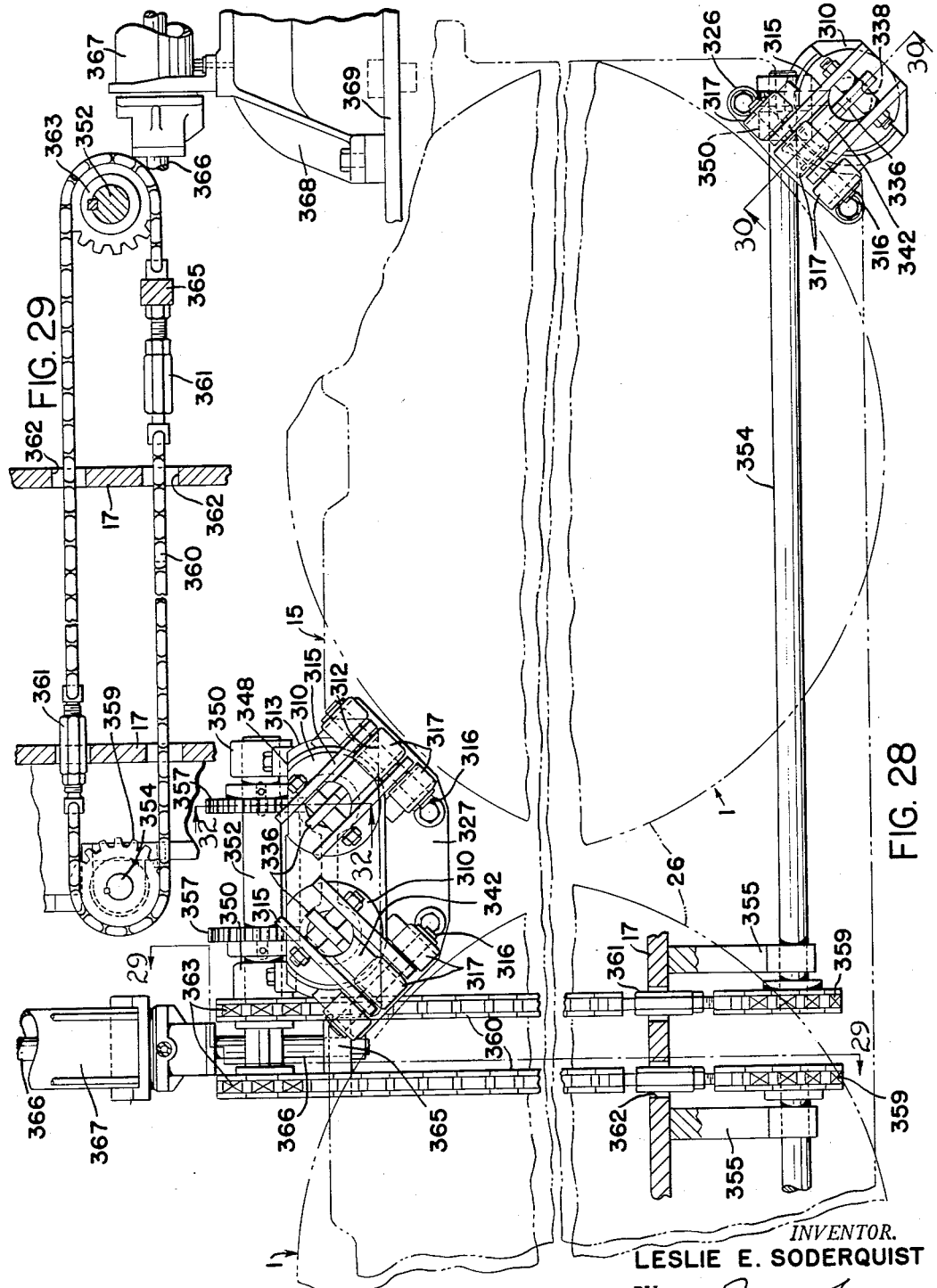

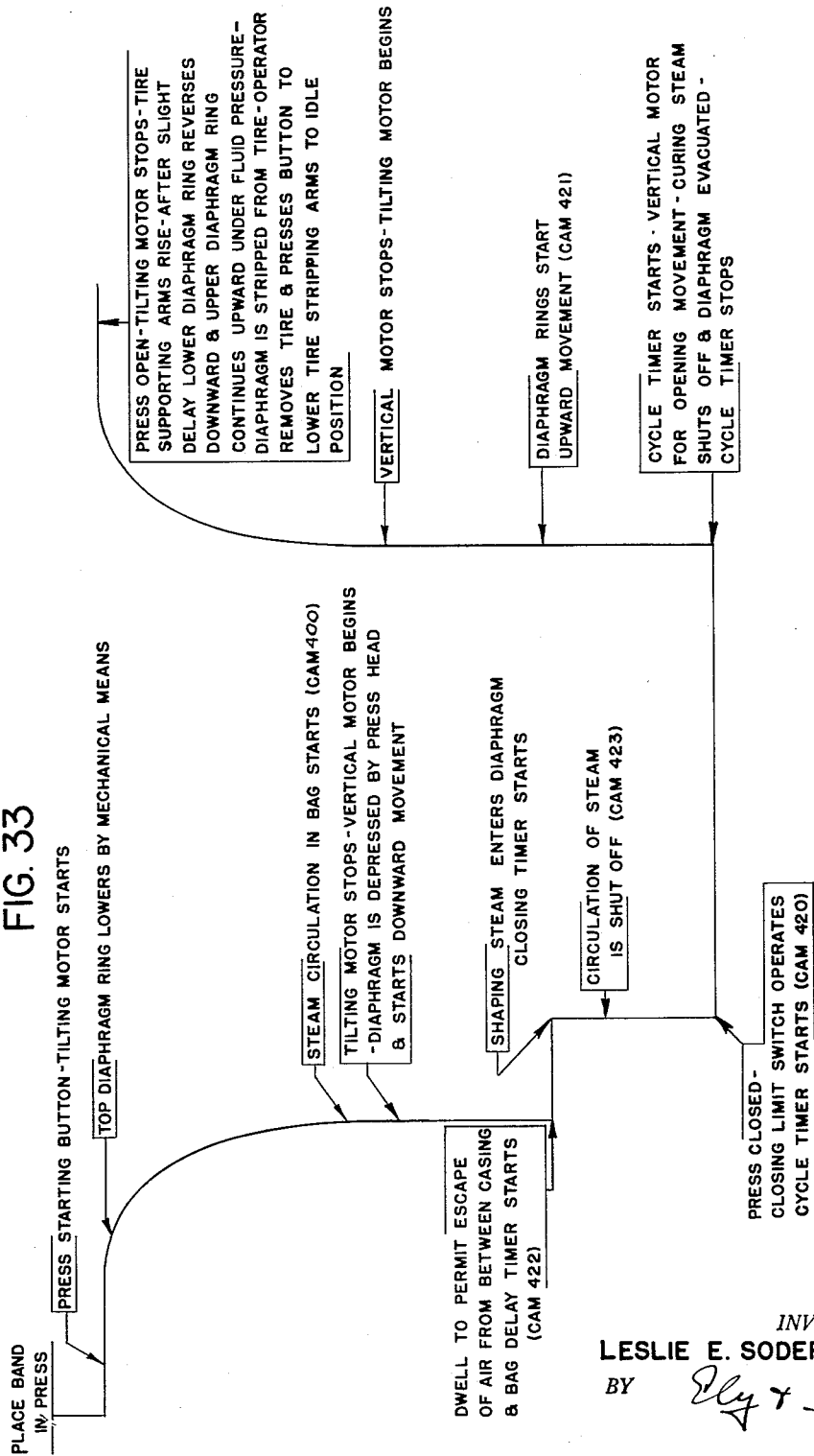

United States Patent Office 2,715,245
Patented Aug. 16, 1955

2,715,245

PRESS FOR SHAPING AND CURING PNEUMATIC TIRES

Leslie Edward Soderquist, Akron, Ohio, assignor to The McNeil Machine & Engineering Company, Akron, Ohio, a corporation of Ohio Application February 5, 1952, Serial No. 269,943

30 Claims. (Cl. 18—17)

The present invention relates to tire vulcanizing presses of the type in which the tire is shaped during the closing of the press by means of a diaphragm or "blanket," which is a permanent part of the press and replaces the old style air bag. Presses of this type have become successful since the development thereof by this applicant, as shown in various prior art patents issued to him. The press shown and described herein is patterned along the general lines of the presses shown in applicant's prior Patents Nos. 2,495,663 and 2,495,664 dated January 24, 1950, and is also an improvement upon a similar type of press shown in applicant's co-pending application Serial No. 217,627, filed March 26, 1951.

The purpose of the present invention is to design a press of this general type which is especially adapted for the shaping and curing of larger tires than it has been possible or practicable to handle in the presses shown in applicant's prior patents and pending application.

Pneumatic tires are made upon so-called building drums which deliver the uncured tire in "pulley-band" form. When this process is used for the making of tires of large cross sections, such as used on trucks, buses, or agricultural or earth-moving machinery, the uncured bands are very heavy and of great width.

Due to the size and weight of the tire, it is a laborious operation to place the band in one of the older forms of presses. Also, there is not sufficient clearance afforded in the older forms of presses to accommodate these wide pulley-bands. The present form of press is especially designed to meet the problems of shaping and curing these large tire bands and, in order to adapt the diaphragm shaping and molding system to those tires, the movable press head and its operating mechanism is especially designed to move the upper press head entirely out of the way and to one side of the press after the direct line movement so that the heavy tire band may be lifted into position in the press by overhead tackle or the like. Furthermore, by having the upper press head movable in the manner shown herein, valuable head room in the factory is saved and it is possible to locate these presses in the existing curing rooms without making special provision therefor.

As the top or movable head of the press is very heavy and, during opening, is first raised in a straight line and then tilted or swung in an arc to a position at one side of the press (the reverse being true during the closing of the press), a dual power mechanism is employed, one element thereof being designed to perform the head tilting or swinging phases of the press opening and closing movements and the other to perform the raising and lowering of the head in the direct vertical line which is essential to the operation of diaphragm shaping and curing.

It is one of the objects of the invention to correlate and coordinate the operation of the two power units so that the opening and closing movements when started will continue in regular sequence and without attention on the part of the operator.

It is also a purpose of the present invention to improve upon the mechanism for operating the diaphragm unit, both during the closing and shaping operations of the press and during the subsequent opening of the press and the stripping of the diaphragm from the cured tire.

A further object of the invention is to improve upon the construction and operation of the tire lifting arms which come into operation during the opening of the press and support the cured tire and strip it from the diaphragm during the extension of the diaphragm.

Other improvements have been achieved, as will be brought out more in detail in the description and drawings. The perfection of a diaphragm shaping and curing press which will successfully handle very large pulley-bands is a valuable contribution to this art.

It has been the aim of the present inventor to reduce the labor and oversight of the process to a minimum. In fact, in the regular operation, aside from the placing of the uncured band in the press and the removal of the cured tire, the only act required of the operator is to press a button and the press shapes the tire band and cures it and, at the end of the curing operation, opens automatically and presents the cured tire in position so that it can be readily removed. He also has to press a button to move the stripping arms into idle position.

The press is shown of the dual or twin type as this is the more economical and efficient form of press, but it will be understood that the principles of the invention may be adapted to single or multiple mold units. The particular form of press shown is of the "steam dome" type in which the molds are housed in a steam chamber when the press is closed, but this is optional as the press may be of the heated platen type.

The press has been designed so that its operation is very flexible. Tire companies have varying and differing procedures in the curing of their tires and it is one of the objects to provide a press of this type which may, by a few minor adjustments, be adapted to any recognized procedure and to a great variety of tire sizes.

The description and drawings give the best known and preferred form of the improved press in sufficient detail so that its construction and operation will be understood. Many of the standard accessories which are employed, such as the usual timers, electrical controls, piping and valves for the admission of steam or fluid pressure for shaping and curing the tire and for operating other parts of the press, have not been shown, reference thereto and to the operations to be performed being sufficient for one skilled in the art to understand the operation of the press and provide the necessary accessories.

It will be understood that having explained the invention in its best known and preferred form, the invention is not limited to details, which may be altered, modified or improved without departing from the essentials of the invention.

In the drawings:

Fig. 1a is an elevation similar to Fig. 1 but showing the upper press head at the top of its vertical travel.

Fig. 2 is a front elevation of the dual press, closed.

Figs. 3, 4 and 5 constitute a composite plan view of the closed press from left to right in the order named, the lines between Figs. 3 and 4 being indicated by the dotted lines a—a in those figures and the lines between Figs. 4 and 5 by the dotted lines b—b.

Fig. 6 is a vertical section through one side of the press showing certain elements of the power mechanism by which the heavy head of the press is operated. This view is taken on the line 6—6 of Fig. 1 and is taken on the left hand side of the press.

Fig. 7 is a side view of the improved mechanism for initially reducing the overall height of the diaphragm which occurs prior to the contact of the upper mold or press head with the diaphragm. The location of this view is indicated by the lines 7—7 of Figs. 4, 6, and 9.

Fig. 8 is a detail on the line 8—8 of Fig. 7.

Fig. 9 is a section on the broken line 9—9 of Fig. 7, through the mechanism for operating the diaphragm in the first stages of the closing movement of the press.

Figure 1:
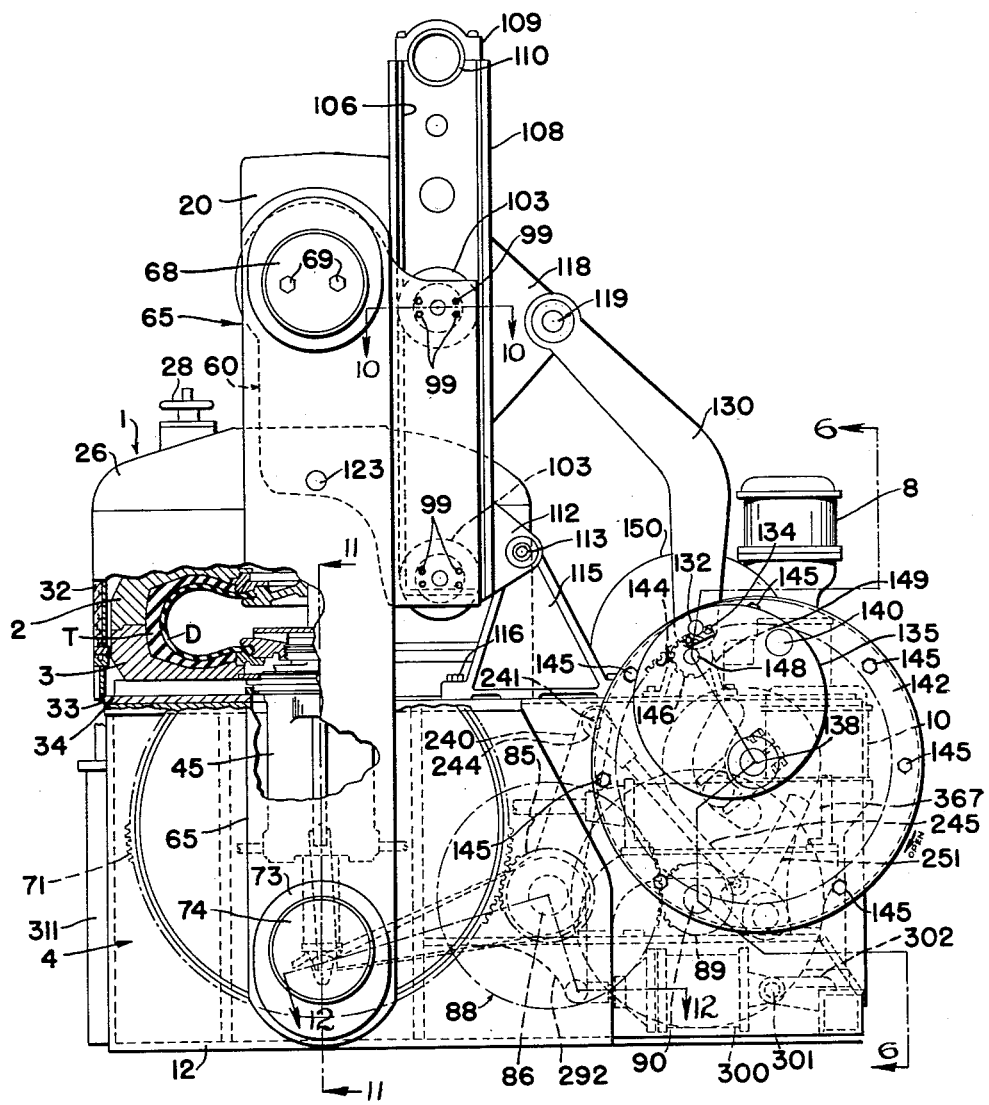
Fig. 1 is a side elevation of a complete press, this view showing in full lines the press head closed and in the position in which the tire is cured.

Fig. 10 is a horizontal section on the line 10—10 of Fig. 1 showing a detail of the roller and guide which guide the press head during the vertical phases of its movements.

Figure 11:
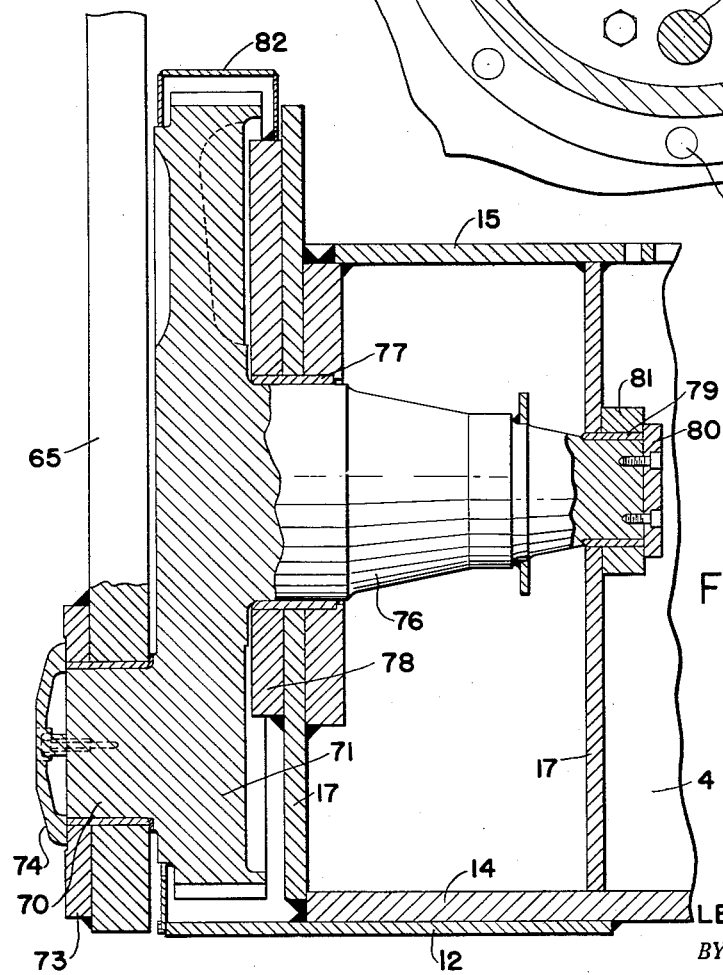

Fig. 11 is a vertical section on the lines 11—11 of Figs. 1 and 24 showing the main toggle arm.

Fig. 12 is a horizontal section on the broken line 12—12 of Fig. 1, showing the linkage which gives the preliminary vertical contraction of the diaphragm.

Figure 13:
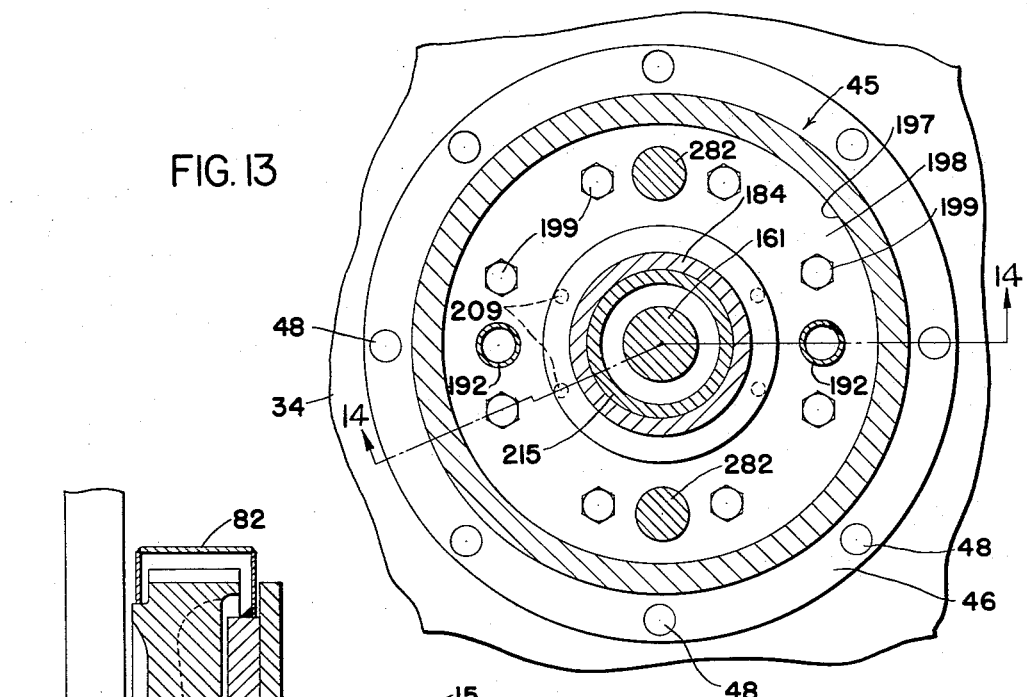

Fig. 13 is a horizontal section through the top of the diaphragm operating cylinder taken on the line 13—13 of Fig. 14.

Fig. 14 is a vertical section through the diaphragm operating cylinder on the line 14—14 of Fig. 13.

Fig. 15 is a detail on the lines 15—15 of Figs. 16 and 17 of the link mechanism for manipulating the upper diaphragm ring.

Fig. 16 is a side view of the link mechanism.

Fig. 17 is a view showing the cured tire on its expanded diaphragm and lifted from the lower mold section.

Fig. 18 is a view showing the diaphragm partially stripped from the cured tire.

Fig. 18a is a side view of the lower diaphragm ring in the raised position.

Fig. 19 is a view showing the uncured band as it is set in the press.

Fig. 20 is a view showing the preliminary contraction of the diaphragm.

Fig. 20a is a view looking at the top of the upper diaphragm ring on the line 20a—20a of Fig. 20.

Fig. 21 shows a further stage in the shaping of the uncured tire band.

Fig. 22 is a side view of the press in fully opened position with the press head completely tilted and out of the way and with the cured tire fully stripped from the diaphragm.

Fig. 23 is a section through the drive mechanism for the large bull gear which operates the main toggle, the section being taken on the line 23—23 of Fig. 22.

Fig. 24 is a vertical section through the bed of the press on the line 24—24 of Fig. 5 showing the interlocking mechanism which serves as a safety device to prevent both of the head operating motors from operating at the same time.

Figure 25:
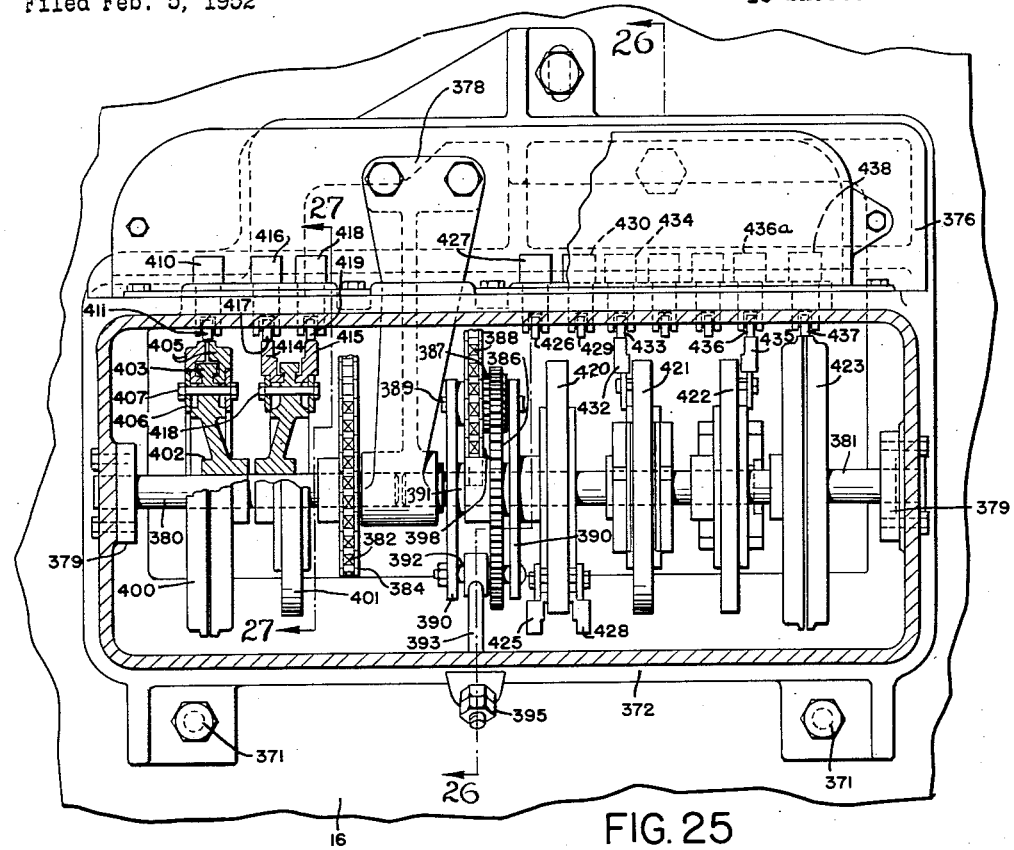
Figure 26:
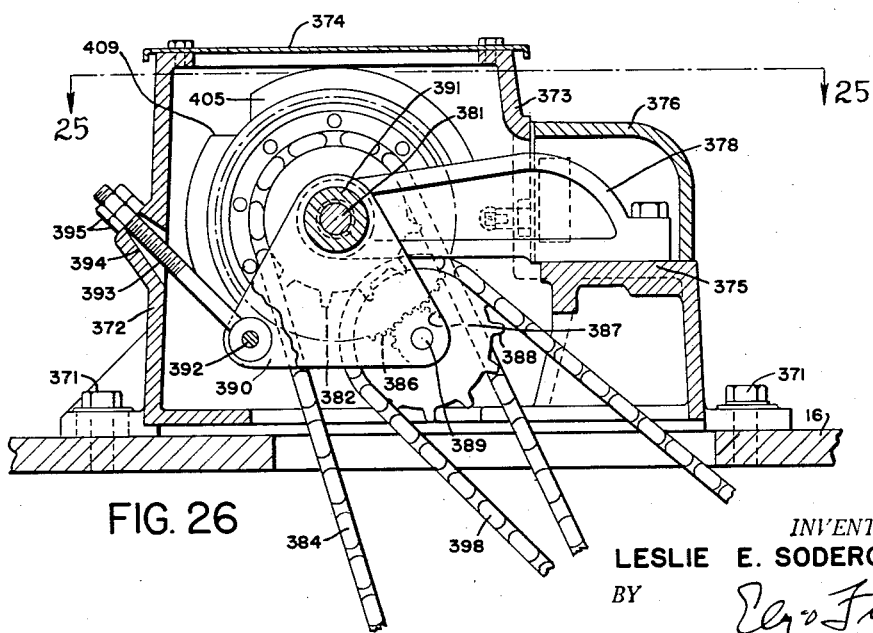

Fig. 25 is a sectional view on the line 25—25 of Fig. 26 showing the interior of the control box in plan. The control box contains the various cams which operate the various electrical connections by which the sequence of operations is set in motion and controlled.

Fig. 26 is a vertical section on the line 26—26 of Fig. 25.

Fig. 27 is a detail of one of the operating cams on the line 27—27 of Fig. 25.

Fig. 28 is a plan view looking down at the mechanism for operating the tire stripping arms.

Fig. 29 is a view taken on the line 29—29 of Fig. 28.

Fig. 30 is a vertical section on the lines 30—30 of Figs. 5 and 28 showing details of the mechanism for operating the tire stripping arms.

Fig. 31 is a section on the line 31—31 of Fig. 30.

Fig. 32 is a detail section of the stripping arm mechanism on the line 32—32 of Fig. 28.

Fig. 33 is a schematic diagram showing a typical sequence of press operations as they occur during the movement of the press head.

GENERAL DESCRIPTION

As indicated in the foregoing, the press shown and described herein is especially adapted and intended for the shaping and curing of large and heavy pulley-bands which are thereby converted to tires of large cross section. The pulley-band or unshaped and uncured tire is given the reference letter B where it appears, while the finished tire is given the letter T. The diaphragm is a relatively heavy sleeve composed of rubber stock such as usually employed in the making of inner tubes. It is given the letter D. The diaphragm is cured in its operative shape and is usually barrel-shaped in its normal condition. Its upper and lower edges are provided with enlarged beads d, which are gripped on the diaphragm supporting rings which, with the diaphragm, constitute a pressure chamber which is expanded as the press closes and the rings approach one another to shape the tire band to the form in which it is cured. This operation is fully described in applicant's prior patents.

The large pully-bands with which this press deals are formed on drums which usually have very deep bead seats. This causes the edges of the bands or the beads of the tire, indicated at b, to stand inwardly from the main body of the band for a much greater distance than is found in the making of smaller tires. This is illustrated in several views, but more particularly in Fig. 19. Due to the increased perimeter from bead to bead on the band, the diaphragm in extended condition has an overall height exceeding substantially the overall height of the uncured band.

Due to the excess in overall height of diaphragm to pulley-band, it is necessary to collapse or contract the diaphragm for a substantial distance to bring the upper diaphragm ring in register with the plane of the upper bead b in the pulley-band before inflating the diaphragm. If this contraction were not done before inflating the diapragm, the upper portion of the diaphragm would tend to bulge over the upper edge of the band and be pinched as the press closes. This is set forth more fully in my copending application above referred to, but is referred to herein as one of the first steps in the operation of the press is to impart this preliminary contraction or reduction in the height of the diaphragm.

The sequence of operations will now be given as a brief statement thereof will enable the constructional details to be more readily understood. Reference is here made to a typical sequence of operations such as may be carried out and as shown in Fig. 33, it being understood, however, that owing to the flexibility of the press operations, changes may be made in the various time intervals and some of the operations may be omitted altogether. The varying techniques adopted and used by the tire manufacturers makes it advisable to provide the press with readily adjustable means for giving the press the capability of going through any preferred steps in the cycle.

Referring particularly to Fig. 33 in connection with other views;

The press being in fully opened position and ready to start the shaping and curing of a tire, the various parts of the press are in the position shown in Fig. 22, except that the tire T is removed and the tire supporting arms are lowered and out of the way, as shown more particularly in Fig. 2. The upper press head, which is given the general reference numeral 1, is tilted backwardly to its full extent, in which position it has been moved through an arc of approximately 90° from its horizontal position and is wholly at one side of the tire-shaping or "bagging" mechanism. The press head carries the upper mold section 2. The lower mold section 3 is supported on the lower bed plate or housing, which is given the general reference numeral 4. The diaphragm is fully extended, its lower diaphragm ring being seated in the lower mold and its upper ring being fully distended, the diaphragm being in a substantially cylindrical form, but as the diaphragm chamber is connected to a vacuum at the end of the curing operation, it will tend to assume a wrinkle or scalloped condition.

The operator now places the uncured tire band B in the press, telescoping it over the extended diaphragm and placing the lower bead *b* on the projecting edge of the lower diaphragm ring. The removal of the press head to the side enables this operation to be done by overhead block and tackle. The band being in position, the operator presses the starter button which, through appropriate relays, starts the tilting motor in operation. The operation of the tilting motor, given the reference numeral 8 and so called because it rocks the press head, brings the upper press head from the position shown in Fig. 22 to that shown in Fig. 1*a*, where the press head is horizontal and directly over the lower mold and the diaphragm assembly, but elevated therefrom and with the upper mold out of contact with the upper diaphragm supporting ring, the extent of spacing depending upon the width of the diaphragm. The press head is now ready to start its vertical downward movement, and at the end of the tilting movement the tilting motor is shut down and the vertical motor, given the reference numeral 10 and so called because it moves the upper press head vertically, begins its operation.

During the tilting movement, the upper diaphragm ring is moved downward to give the preliminary contraction to the diaphragm. The extent of this preliminary contraction is variable over a considerable range, from zero in case the band does not have a deep recess on its inner surface, as may be the case where the building drum is not provided with a deep bead seat, to a maximum great enough to take care of the most extreme bead seat. The purpose is to lower the upper diaphragm ring to a point where there is a substantial register between the upper diaphragm ring and the upper bead *b*, as shown in Fig. 20. At approximately the same time, circulating steam at low pressure is introduced into the chamber composed of the diaphragm and the diaphragm rings. The primary purpose of the low pressure steam, which is usually about 20 lbs. to 25 lbs., is to give the preliminary shaping to the bag, causing it to belly outwardly sufficiently to follow the contour of the inner surface of the band B and, at the same time, to give the band a slight outward bulge. This is shown in Fig. 20.

When the tilting motor is stopped by the operation of a transfer switch, the vertical motor takes over and the press head is moved vertically downwardly in the guide provided for this purpose. As the press head moves downwardly, it comes into contact with the upper diaphragm ring and the contraction of the diaphragm chamber with the shaping of the band progresses from this point to the final closing of the press, with the two mold sections in contact and the band in tire form, as shown in Fig. 1.

At a stage during the lowering of the upper press head, the circulation of the low pressure steam through the diaphragm chamber is preferably shut off for the reason to presently appear.

It has been found that in the shaping operation, particularly with tire bands having deep bead seats, air will be entrapped between the diaphragm and the inner surface of the band, and that if the air is permitted to remain between the diaphragm and the band objectionable blisters will be formed on the tire during the vulcanizing operation. For this reason, it has been found desirable to provide some means for allowing the escape of the entrapped air before the mold is fully closed.

To accomplish this result, the closing movement of the press is temporarily arrested at a point approximately indicated in Fig. 21. This momentary cessation of press closing permits the diaphragm to relax slightly, so that the entrapped air may escape around the edges of the tire band. This condition is sought to be shown by the double line between the diaphragm and the band, as seen in Fig. 21.

The momentary delay in the closing movement of the press after the band has been partially shaped has the additional advantage that it gives a sufficient interval so that the fabric in the bead portions of the tire may turn about the wire reinforcement. It is well known in the art of making tires by the "drum" or "flat band" methods, that in bringing the uncured tire band from the drum form in which it is built to the tire form in which it is cured, the fabric must adjust itself to its new form in the bead regions of the tire. The beads are solid masses of wire and the fabric has to rotate about the beads in finding its new location. By delaying the closing action of the press, time is given to permit the fabric to assume its new position before the mold closes about it and this is especially desirable in the shaping and curing of large tires where the readjustment of the fabric takes longer than in smaller tires.

The fact that in the press shown the diaphragm is under a fluid pressure facilitates the accomplishment of the two stated objects for the delay in press closing, i. e., allowing a sufficient interval for the air to escape between the diaphragm and the tire band, which is accompanied by a closer fit between the diaphragm and the tire and the rotation of the plies of fabric about the bead so that when the mold closes about the tire the fabric has adjusted itself to its new position.

There is a so-called delay limit switch which arrests the downward movement of the upper press head and starts two timers in operation, one to control the period of delay and the other to become operative after the end of the delay period to admit the shaping and curing steam at the higher pressure.

The delay timer having completed its brief cycle, the vertical motor is again started in operation and the press closes, the lowering of the upper press head being arrested by a limit switch as the mold sections close together under the power exerted by the main operating toggle. At some point, here during the final closing movement, the circulation of steam through the diaphragm is shut off, allowing the pressure within the diaphragm to build up to the curing pressure.

The operation of the closing limit switch starts a main or cycle timer, which controls the time of vulcanization, during which the press is closed. Steam is admitted to the steam dome during vulcanization.

Just before or at the time that the main or cycle timer reaches the end of the curing cycle, the high pressure steam to the diaphragm is shut off, and the interior of the diaphragm is connected through suitable valve mechanism to the exhaust and then to a source of vacuum, which evacuates the diaphragm chamber so that the diaphragm will be restored to its collapsed and extended position as the diaphragm rings operate to stop or "debag" the cured tire. At the same time the steam to the steam dome is shut off.

As the main timer reaches the end of its cycle, the vertical motor is again energized and the upper press head starts on its vertical upward movement, the vertical motor being reversed.

After the upper press head has moved to a limited extent, usually about 15 inches, and while the upper press head is still retreating, the diaphragm rings, which are in the close relation which they assumed at the end of the press closing movement, and the cured tire, are raised to lift the cured tire well above the lower mold section 3, to the position approximately that shown in Fig. 17, where the tire and diaphragm assembly rests until the press is fully opened. It will be seen that the tire is thus promptly removed from contact with the lower mold and held out of contact therewith so that overcuring of one side of the tire is avoided.

As the upper press head reaches the top of its vertical movement, the vertical motor is stopped and the tilting motor, which has been reversed, takes over, returning the press head to its fully open position, whereupon a so-called open limit switch stops the press head movement.

The operation of the open limits switch starts the diaphragm stripping or "debagging" operation. This "debagging" operation comprises three movements, all of which are initiated simultaneously.

The tire lifting or stripping arms rise from their vertically idle positions to assume a horizontal position beneath the tire, to support and lift it, as shown in Fig. 17. During the balance of the stripping operation, the arms, which are hydraulically operated, continue to rise as much as possible against the resistance offered by the diaphragm, but as the diaphragm is being withdrawn that resistance decreases and the stripping arms will move upwardly as the diaphragm is withdrawn from the interior of the tire until the diaphragm straightens out, whereupon the stripping arms move to the full upward extent, stripping the tire T and holding it in the position shown in Fig. 22, where it may be removed from the press by hand or by a block and tackle, which is now accessible to the tire as the upper press head is completely out of the way.

The lower diaphragm ring is now lowered to its original position on its seat in the lower mold section. This operation is accomplished by the reversal of the valves which admit pressure to the cylinder which operates the diaphragm assembly.

At the same time, the upper diaphragm ring is raised to its full extent by pressure admitted to its operating cylinder and this extends the diaphragm to its full height and holds it in that position until the closing movement of the press. It will be seen that the diaphragm is withdrawn by movement of the two diaphragm rings in opposite directions. This enables a larger diaphragm to be employed than where the extension is in one direction only.

After the tire is removed, the operator presses a button by which the cylinder for raising the tire stripping arms is reversed, and the arms fall to their lower positions.

There are several safety devices used in the machine. As the tire stripping arms rise, they open the circuit to the motors and no motion of the press can take place so long as the arms are raised. This insures that the arms will not accidently be struck by the closing of the press. There is also an interlocking feature which prevents the operation of either the vertical motor or the tilting motor if the other is in operation. Ordinarily, the several limit switches will take care of this, but the additional safety device insures against injury to the press which would occur should either limit switch fail. There is also a safety switch which prevents overrunning of the vertical motor at either end of its travel. This prevents the press from moving beyond its closed position should the closing limit switch fail and also against moving beyond the point where the tilting movement should begin, on the opening of the press. There is also provided mechanical interference which prevents the tilting motor from overrunning at either end of its intended cycle.

THE PRESS FRAME AND MOLD SECTIONS

The bed of the press, which has been given the general numeral 4, is composed of a lower plate 12, which is at the front of the press beneath the two lower mold sections 3. Plate 12 is welded to a heavy horizontal plate 14, which supports a main bed plate 15 on which the lower mold sections are secured. At the rear of the press a second bed plate 16 is located, which supports much of the operating mechanism. Heavy vertical plates 17 support the bed plate 15 from the plate 14 and a plurality of longitudinal and transverse vertical plates 18, extending between the upper and lower plates, complete the frame work and support various operating parts of the press. The whole structure is welded together to form a rigid support adapted to withstand the heavy strains placed upon the press during its operation.

The upper press head is composed of a heavy cross head in the form of an I-beam 20, which spans the front of the press (as shown in Fig. 2). It carries the two upper mold sections 2 by mechanism, the details of which are not essential to the present invention.

It is sufficient to say that each upper mold section is fastened to a ring-shaped block 22, the inner surface of which is threaded to receive a double threaded adjusting sleeve 23, which is in turn threaded on a shaft 24 carried by the cross head 20. (See Fig. 22.) Over each upper mold and carried by the cross head is a concave cap plate 26, which forms a part of the steam dome. The height of the upper mold may be adjusted by rotating the sleeve 23 through a capstan 28 having a pinion 29, which engages and drives a toothed disk 30 attached to the sleeve. This arrangement permits the block 22 to be raised or lowered to accommodate differing sizes of molds. For further details of mechanism suitable for adjusting the press to accommodate molds of varying thickness, see applicant's prior Patent No. 2,358,763, September 19, 1944.

The steam dome surrounding the upper mold section is covered with a heat-insulating cover indicated as a whole at 32, the lower edge of the cover being adapted to fit closely against the upper edge of a mating heat-insulating ring 33 attached to the bed of the machine so that each mold is completely housed in a steam chamber when the press is closed. The lower side of the steam box is closed in by a plate 34 supported upon the bed plate 15. Welded at the center of the upper mold section is a bearing ring 35, the lower inner surface of which is beveled as at 36 so as to mate with a correspondingly beveled surface on the upper diaphragm ring as the mold closes (see Fig. 21) to force the upper diaphragm ring downwardly during the vertical lowering movement of the upper press head. The bearing ring has a ledge 37 which overlies the upper tire bead.

The lower mold section 3 is supported upon a plurality of radial ribs 40, which are fixed to the lower side 34 of the steam box. Around the inside circumference of the lower mold section is a groove 42 which is adapted to serve as a dowel to center the mold section and which fits around a register ring 43 which is seated in a groove in the upper end of the diaphragm operating housing, which is given the general reference numeral 45 and which will be described in detail later. The housing 45 has an upper overhanging ledge 46 which forms the bottom of the groove in which the ring 43 is seated. A plurality of bolts 48 pass through the ledge and are threaded into a ring 50 welded to the plate 34. The lower ends of the bolts 48 are reduced and enter recesses in the plate 34 to further hold the mold registering means in position. A packing gland 51 is located between the inner edge of the ring 50 and an overhanging shoulder on the housing 45, to seal the lower edge of the steam box. The main body of the housing 45 projects downwardly through openings in the plate 34 and the base plate 15.

The upper inside edge of the lower mold section is cut away as at 54 to expose a portion of the lower bead of the tire and in this recess lies a part of the lower diaphragm ring so that it will engage the edge of the lower bead whereby the tire may be lifted from the lower mold section at the end of the vulcanizing period. (See Fig. 14.)

THE PRESS HEAD OPERATING MECHANISM

As indicated above, the press head is moved through two distinct paths or phases, one being the rocking movement which carries the press head from a position at the side of the press, as shown in Fig. 22, to a position immediately above the lower mold section and parallel to the bed plate, as shown in Fig. 1a. The other phase is the vertical movement which moves the press head from the position shown in Fig. 1a to the position shown in Fig. 1. The vertical phase will be described first.

(a) The Vertical Press Head Movement

At each end of the heavy beam or cross head 20 is fixed a vertical plate 60, the outline of which is shown in Figs. 1 and 1a. This plate has a forward portion, the upper end of which is received over a register 61 formed as a part of the head 20. At each end of the head 20 is a trunnion 62 which is received in a bearing 63 carried in the upper end of a long heavy link 65. A reinforcing plate 66 is welded to the upper end of the link 65 and a cap plate 68 is secured by bolts 69 in the end of the trunnion.

The links 65 are located at either side and constitute the main elements of the toggle by which the press head is moved toward and from the bed of the press. The lower end of each link is received on a bearing 70 projecting from the side of a large gear known as a "bull gear" 71. A reinforcing plate 73, welded to the lower end of the link 65, and a cap 74 hold the lower end of the link on the bull gear. Each bull gear 71 is located at one side of the base 4 and has an inwardly projecting shaft 76 which is enlarged immediately behind the bull gear and received in a bearing 77 set in one of the vertical plates 17, the plate being reinforced at this point by supplemental plates 78 welded thereto. The end of the shaft 76 is reduced and set in a second bearing 79 located in the companion frame plate 17 and held in position by a cap 80 and reinforcing ring 81. This makes a sturdy bearing for the lower end of the link. A cover plate 82 surrounds the exposed surface of the bull gear.

Each bull gear 71 is in mesh with a drive pinion 85 fixed to a shaft 86, which is rotatably mounted in the lower frame work at either side of the base. Each shaft 86 is keyed to a larger gear 88 and these gears mesh with drive pinions 89 which are keyed to the main power shaft 90 from the vertical motor. Shaft 90 extends across the rear of the press, being mounted in bearings in the lower frame, one of the bearings being indicated at 92 in Fig. 6. To the ends of the shaft 90 are fixed pinions 89. At the right hand end of the shaft, as shown in Fig. 6, a special mounting is provided for the pinion 89 in order to provide a ready means for aligning the two pinions. As shown in Fig. 6, this pinion 89 is fixed to the end of the shaft 90 by a cap plate 93 held by bolts 94 which enter the pinion and drive a wedge shaped collar 95, which is keyed to shaft 90.

The vertical motor 10 is mounted at a midway point at the rear of the base and is connected to the main vertical power shaft 90 through appropriate reduction gearing housed in the casing 97. As the motor is actuated, the main links 65 are raised and lowered, according to the direction of motor rotation, moving the cross head 20 and the upper mold section carried thereby toward or from the lower mold section, the rotation of the motor being arrested by the close and open limit switches referred to.

To guide the upper press head in the straight vertical path during the operation of the vertical motor, the rearward portion of each plate 60 is provided with two vertically spaced, inwardly facing sockets 98 in each of which is secured, by bolts 99, the base of a bearing block 100, which has a reduced hub 101 on which is rotatable a guide roller 103 held in place by a plate 104. (See Fig. 10.) The pairs of rollers 103 on each side of the press guide the upper press head by rolling in vertical tracks 106 formed in the outer faces of long guide rails 108 located at the sides of the links 65. These guide rails 108 are of sufficient height to keep the upper press head in its proper straight line movement and are surmounted by caps 109. A long shaft 110 extends across the top of the press, having its ends seated in the caps 109, to hold the two rails in fixed position.

Near the lower end of each rail 108 and at the rear is formed a bracket 112 through which passes a pivot shaft 113 received in the upper side of a triangular bearing block 115 which is firmly anchored to the bed plate of the press by bolts 116. The brackets 112 support the guide rails and also provide the pivotal mounting about which the upper press head rocks during its tilting movement.

At a midway point on the rear face of each vertical guide rail is formed a second bracket 118, which forms the bearing for a pin 119 by which the tilting movement of the press head is transmitted from the tilting motor 8, as will be described.

In order to insure against any lateral shifting of the molds during the movement of the press head, shoes 122 are adjustably mounted in the links 65, each shoe having a flat bearing surface which contacts the outer face of its adjacent plate 60. Each shoe has a stem 123 threaded in a link so that the proper adjustments may be made to keep the two mold sections in accurate register.

(b) The Tilting Press Head Movement

Pivotally mounted at its upper end, on each of the pins 119, is a swinging link or crank arm 130. The lower end of arm 130 is pivotally mounted on a bearing 131 on a pin 132. Pin 132 is fixed by a locking plate 134 at one end of the pin near the rim of an eccentric disk 135 which is welded to a hub 137 keyed to the outer end of a shaft 138 rotatably mounted in bearings 139 welded to vertical plates 18 forming the lower rear portion of the bed of the machine. (See Fig. 6.) Located to the right of pin 132 (Fig. 1), and connecting the disk 135 to the disk 142 (to be described), is a second pin 140. When the press is fully open, the elbow or bend in the link 130 approaches the hub 137, and overrunning of the tilting motor in opening will cause the link 130 to strike the hub 137, bringing the motor to a stop through an overload switch. Conversely, should the tilting motor overrun in the closing movement, the pin 140 will strike the arm 130 and stop the motor.

Parallel to and spaced from the disk 135, and also welded to the hub 137, is a larger disk 142 which is concentric with the shaft 138. The other end of the pin 132, on the opposite side of the link 130, is mounted in the edge of this larger disk 142. Disk 142 forms a cover for a large internal gear 144, to which it is fixed by bolts 145. A plate 143 holds the hub 137 on the shaft 138.

The two gears 144, located at opposite sides of the press, are the propelling means for tilting the upper head through the link connection 130, as has been described. Each gear 144 is driven by a pinion 146 which is keyed to either end of a long driving shaft 148 which extends across the rear of the press. At the right hand side of the press, the shaft 148 is mounted in the upper end of a bracket 149 secured to the bed of the press. At the left side of the press, the shaft is received in the gear reduction unit 150 which is also mounted on the bed plate and driven by the tilting motor 8 (Fig. 3).

(c) Résumé

It will be seen from a description of the timing mechanism which will be given at the close of the specification that the sequence of operations of the upper press head is carried out by the two motors. First, the tilting motor moves the press head to its horizontal raised position, then the vertical motor lowers the press head to close the mold. After the curing cycle is finished, the vertical motor reverses and raises the press head, whereupon the tilting motor, moving in reverse, restores the press head to its starting position.

THE DIAPHRAGM AND ITS OPERATING MECHANISM

The diaphragm D is molded with the circumferentially enlarged or beaded portion d, by which it is secured to its two rings.

The upper diaphragm ring is composed of a ring 160 which fits on the upper end of a vertical upper ring supporting and operating shaft 161. Around its outer edge, ring 160 is provided with a ledge 162 over which the upper edge of the diaphragm is fitted and to which it is held by a clamping ring 163 through bolts 164. The meeting edges of the ledge 162 and the ring 163 are grooved as shown in the drawings to hold the diaphragm securely. The outer perimeter of the ring 163 is beveled, as at 165, to mate with the beveled surface 36 on the bearing ring 35 secured to the upper mold section.

The center of the ring 160 is provided with the groove 166, in which is fitted the correspondingly grooved depending flange of a two-piece collar 168 which fits over the upper end of the shaft 161 and is held thereon by clamping bolts 169.

The lower diaphragm ring is composed of two main sections. The lower section 170 is a ring, the outer edge of which forms the inside surface of the lower tire bead and is given the numeral 171. At its lower edge, this surface is provided with a circumferential lip or ledge 173 which underlies the lower tire bead and fits in the circular recess 54 cut in the lower mold section in order that the ring 170 may lift the tire when the press opens at the end of the cure. The upper side of the ring 170 forms the support for the lower edge of the diaphragm. The inside of the ring is provided with a ledge 174.

The upper section of the lower diaphragm ring is indicated at 175. It has a projecting ledge 176 which, with the section 170, clamps the lower edge of the diaphragm. The section 175 rests upon and is centered on the ledge 174 to which it is held by bolts 178. The top of the section 175 is formed with a conical depression in which is seated a ring-shaped cap piece 177 held by bolts 177a (Fig. 21). The cap piece is formed with a plurality of radiating channels 178 which may be covered by a plate or plates 179 held by bolts 179a. These channels direct the steam which enters the diaphragm toward the inside of the tread portion of the diaphragm.

The inner periphery of the ring section 175 is provided with a threaded hub, indicated at 180, and an overhanging ledge 181. The inside surface of the ring fits against and is threaded on the upper end or head 183 of a long cylinder 184. Packing rings 185 seal the passage between the ring 175 and the head 183. Head 183 is cored out to form a steam space 188, which is closed at its upper side by a plate 189 located in the center of the cap piece 177. The underside of the plate is formed with grooves 190 which conduct the steam from the space 188 to the passages 178 and thence to the interior of the diaphragm (see Fig. 14).

Depending from the underside of the head 183 and secured therein to communicate with the space 188 are two vertical pipes 192 located at diametrically opposite points. Each pipe extends into a long steam chamber 193 in the side of the lower diaphragm housing 45 and provided at its lower end with inlet and exhaust conduits 194—194, through which steam is admitted to and exhausted from the diaphragm. Each steam pipe is movable vertically in its chamber 193 as the lower diaphragm ring rises and falls, and the space around the pipe is closed in by a packing gland 196 bearing against the underside of a closure ring 198 seated in a recess 197 provided in the upper side of the housing 45 and held by bolts 199. Each gland 196 is held under compression by a coil spring 200 seated in the top of the chamber and resting, at its lower side, on a shoulder 201 formed on the inside of the chamber 193. A gasket 202 is located beneath the ring 198 and compressed against the base of the recess 197. The space between the ring 198 and the cylinder 184 is sealed by a packing gland 204, which is compressed by a ring 205 slidably mounted on the outside of cylinder 184. Ring 205 is pressed upwardly by a series of coil springs 207 which bear against the underside of the ring 205 and on shoulders 208 on the upper ends of long rods 209 which are surrounded by the springs and the upper ends of which slide in the ring 205.

The lower ends of rods 209 are threaded into a compression ring 210, which is located below the lower end of the cylinder 184 and above the flange 211 at the lower end of housing 45.

Located and slidably mounted within the cylinder 184 is a cylinder 215 which constitutes one of the operating mechanisms for the upper diaphragm ring. When the upper diaphragm ring is at its maximum elevation, with the ring above the level of the upper bead of the band B, the upper end of the cylinder is above the plane of the lower bead ring, as shown in Fig. 19, the extent to which the upper edge of the diaphragm is raised being variable and determined by the excess width of the diaphragm over the width of the unshaped band. When the diaphragm has been given its preliminary contraction, and during the balance of press closing, the upper end of the cylinder is at the level of the lower diaphragm ring 175.

Located in the lower end of the casing 45 is a groove 216 in which is located the packing 217 which is compressed against the side of the cylinder 215 by the springs 207 acting on the rods 209.

The upper end of the cylinder 215 is closed by a threaded collar 219 which surrounds shaft 161 and in which the shaft 161 is slidable. The lower end of the shaft 161 is threaded into a piston 220 fitting the cylinder 215. A packing gland 222 is seated in the side of the piston and is held under compression by the flange 223 of a supplementary piston 224, which is urged toward piston 222 by coil springs 225 seated in recesses in the piston 224 and confined by the heads of bolts 226, which are threaded into piston 220 and extend through the recesses in piston 224. Threaded in the piston 224 is the downwardly extending rod 228, which, when the cylinder is lowered as shown in Fig. 14, is spaced from a closure cap 230 fitted into the lower end of the cylinder 215. This rod 228 provides a stop for preventing the piston assembly from dropping out of reach when the operator is replacing a diaphragm. Set in the cap 230 is a conduit 231 by which pressure fluid is admitted to the lower end of the cylinder to raise the pistons 220—224 and distend the cylinder by lifting the upper diaphragm ring, to which it is attached, as previously described.

The under surface of the cap 230 forms a bearing surface for supporting the cylinder 215 as it rests upon the rounded end 233 of a cylinder supporting and lifting arm 234. A stirrup-like projection 235 flanks the sides of the bearing surface 233 and allows for a limited movement between the bottom of the cylinder and a cross pin 236 located in the stirrup. The pin 236 is the means by which the cylinder 215 is moved downwardly during the preliminary contraction of the diaphragm.

(a) Upper diaphragm ring operating mechanism

There are several phases of movement imparted to the upper diaphragm ring, one the preliminary contraction prior to the closing of the press, then the downward movement which is caused by the closing of the upper press head which forces the two rings together; there is then the joint movement of both rings to lift the cured tire from the lower mold section, and finally the raising of the upper ring to restore it to its initial position. As both sides of the press have duplicate mechanisms, only one will be described.

The arm 234 extends to the rear of the press where it is journaled on a flanged bearing sleeve 238 located on the end of the shaft 86, where it projects to one side of one of the vertical bed plate members 18 (Fig. 12) and is supported by a bearing collar 237 welded to the plate 18.

Here arm 234 is welded to a second arm 240, which extends upwardly and is attached to the operating mechanism which gives the preliminary contraction to the diaphragm. The arms 234 and 240 are welded to collars 239 at their bearing on the shaft 86.

The upper end of arm 240 is pivoted on a pin 241 which extends to either side thereof where it is received in slots 243 formed in two parallel arms of a yoke 244 welded to the upper end of a downwardly extending link 245. (See Fig. 7.) The slots 243 give a limited degree of lost motion between the arm 240 and the link 245 which is availed of to allow for an absence of movement of the cylinder 215 in the event no preliminary contraction of the diaphragm is desired.

The lower end of arm 245 is journaled on a pin 247 which is mounted to one side of the axis of pear shaped rocking cam 250, the outline of which is shown in Figs. 7 and 9. The pin 247 is located in the lower end of a long arcuate arm 251 which is a part of the cam 250 and extends upwardly therefrom and parallel to the face of the cam.

Formed in the arm 251 and extending into the opposite face of the cam 250 is a series of aligned holes 253. These holes are formed in the arc of a circle which gradually recedes from the center of rotation of the cam. The purpose of this arrangement is to vary the extent of the stroke imparted to the link 245 and, through the link and the mechanism articulated therewith, to the cylinder 215. It is possible to select any point along the arm 251 in which the pin 247 may be placed. If the pin 247 is placed in the lowermost hole, the extent of movement imparted to the link 245 is small and only sufficient to take up the lost motion between the link 245 and the arm 240. As the pin is moved outwardly along the arm 251, the movement of the link will gradually increase and will be transmitted to increasing extents to the arm 240.

The pin is fixed to a short plate 252 and this is held in adjusted position by a bolt 254 which is threaded into the appropriate socket 255, each hole 253 having a socket to hold the plate as shown in Fig. 7. The lower end of the cam is pivoted on the inner projecting end of a shaft 257 which is supported in two of the bed plate members 18 and is held in position on the shaft by a flanged collar 256 held in a ring 258 welded to the adjacent plate 18 and by a plate 259 fixed to the inner end of the shaft.

The main body of the cam 250 is extended upwardly so that it is located alongside of the end of the presshead tilting shaft 138, the center of the enlarged portion of the cam body being concentric with the shaft 138. The face of the cam body toward shaft 138 is provided with a cam groove 260, the outline of which is shown in Fig. 7, in which the cam is shown in the position it assumes when the two mold sections are parallel. This groove is covered at one side by a plate 261. The other side of the cam body is covered by a second plate 262 which is welded to a disk 263 attached by a bolt 264 to the center of the cam body. This latter plate is cut away to expose the cam track 260.

As noted in the General Description, the cylinder 215 which carries the upper diaphragm plate is moved during the period when the upper press head is moving through the earlier part of its downward tilting movement and, conversely, during the latter part of the upward tilting movement. For this reason, that portion of the cam track 260 which is in engagment with its cam roller (to be described), during those portions of the tilting movement when no motion is to be imparted to the cylinder 215, is concentric with the shaft 138. The upper part of the track, as shown in Fig. 7, diverges from the center of the shaft to impart the movement to the cylinder when required.

Engaging the cam track 260 is a cam roller 268 which is rotatably mounted on a pin 269 located in the end of a crank arm 270 and held in position by nut 271. The arm 270 surrounds and is keyed to the projecting end of the shaft 138 and is held thereon by the bolt 272 which extends through ears 273 located at either side of a transverse split in the crank arm. As the shaft 138 rocks back and forth through the arc during which the press head is tilted, the cam 250 will rock back and forth on its shaft 257 during the period when the eccentric portion of the cam is engaged by the roller 268. This will cause the rise and fall of the top diaphragm ring to the extent dependent upon the location of the lower end of the link 245.

In normal operation, the roller 268 will not pass beyond the position shown in Fig. 7. If the tilting motor should overrun on its closing movement, the roller 268 will pass into a tangential portion of the cam track shown at 260a until the tilting motor is arrested by the pin 140 striking the link 130.

The movement of the upper diaphragm ring from the position shown in Fig. 20 to that shown in Fig. 1 is due to the lowering of the upper mold section, which forces the ring downward against the pressure which is in the cylinder 215. The elevation of the ring to the position shown in Fig. 17 is due to the elevation of the lower diaphragm ring which carries the upper ring with it. At the end of the opening, tilting movement, the cam 260 raises the cylinder 215 to its uppermost position, as shown in Fig. 18, to the extent determined by the adjustment of the link 245 along the arm 251. The raising of the upper diaphragm ring to strip the diaphragm from the cured tire is caused by the admission of fluid pressure to the cylinder 215, which projects the piston 220—224 to its upper limit, which is determined by the piston striking the collar 219 in the top of cylinder 215. The admission of pressure to the cylinder 215, through the conduit 231, is by means of a valve (not shown) which is controlled by the timing mechanism, as will be described.

(b) *Lower diaphragm ring operating mechanism*

The lower diaphragm ring 170 is seated in the lower mold section and stays in this position during the closing of the press. It is on this ring that the lower edge of the band is placed.

The lower ring is carried on the head 183 of the cylinder 184, which is slidable vertically on the cylinder 215. On opposite sides of the head 183 are outstanding lugs 280 which are located between the steam pipes 192. (See Fig. 18a.) In each lug 280 is seated the upper end of a rod 282, being held by nut 283. The rods 282 are guided in vertical passages 284 in lugs 285 projecting from opposite sides of the housing 45. The lower end of each rod 282 is pivoted on a pin 287 which is mounted across a fork 288 formed on the upper end of a link 289. At the lower end of link 289 is a second fork 290 and pivot pin 291, on which is pivoted an arm 292. As shown in Figs. 15 and 16, the links 289 are made in two pieces bolted together at 293.

The links 292 are in pairs on each side of the press and their function is to raise and lower the lower diaphragm ring, first to strip the tire out of the lower mold section, as shown in Fig. 17, and then to move it downwardly, after the tire stripping arms have moved into position under the tire and while the upper diaphragm ring moves upwardly. During these movements the steam tubes are carried by the head and slide in their packings.

Referring to Fig. 1 and the section, Fig. 12, taken thereon, the arms 292 are located at opposite sides of the arm 234 and are pivoted on the bearings 294 located on the shaft 86, a cap 295 on the end of the shaft holding the outer arm in place. The arms 292 are bell crank levers, as shown in Fig. 1, and are connected at their lower inner ends by a transverse shaft 297. Pivoted on the shaft 297 is a block 298 which is threaded on the end of a piston rod 299, the piston of which is slidable in a cylinder 300 located at the rear of the press near the bottom thereof. The cylinder 300 is permitted a limited rocking movement by being pivotally mounted at its rear, as at 301, to a bracket 302 fixed to a transverse sill 303 which extends across the rear of the press. (See Fig. 4.) The flow of fluid pressure to the cylinder 300 is controlled by the timing mechanism, as will be described.

THE TIRE STRIPPING ARMS

(a) The arm mechanism

The tire stripping arms, the function of which is to lift the tire from the position in which it is located by the raising of lower diaphragm ring and to aid in stripping the diaphragm from the tire, are given the general reference numeral 310. They are arranged in pairs, two to a mold, and the arms of each pair are located at diametrically opposite points about a mold and are out of the way of the operator. As will be seen by looking at Figs. 3, 4 and 5 and other views, the tire lifting arms at the front of the molds are located at the corners of the press, while the tire stripping arms at the rear of the molds are located closely together at the center line of the press. This arrangement gets them well out of the way and the angular position causes the arms to extend radially toward the center of the molds as the arms are elevated.

The two front tire stripping assemblies are carried on the upper ends of posts 311, as shown in Fig. 2, while those at the rear are located in a cut-out portion 312 in the rear edge of the bed plate 15. (See Fig. 28.)

Each tire stripping assembly comprises two parallel arms 315 which are bent in the form shown in the several views. Across the outer ends of each pair of arms is a shaft 316, on which are mounted the three rolls 317 which contact the tire. The two arms of each set are tied together by a shaft 314 carrying a sleeve 318 located near the outer ends of the arms and held by nuts 319. The inner ends of each pair of arms are received over a pin 321, on which they are rockingly mounted, being supported on bearing sleeves 322. (See Fig. 31.) The lower ends of arms 315 are squared off as shown at 323 and these squared surfaces, when the arms are in their lowered or retracted condition, contact the flat upper surface of a bearing block 325 which is supported by a plate 326 (or 327) attached to the bed or framework of the press. In the case of the front arms, the bearing blocks are set in the tops of posts 311 and in the case of the rear arms, the lower ends of the blocks are anchored to one of the frame members by a bolt 328 and block 329. The contact between the inner ends of the arms and the top of the bearing block keeps the arms in vertical position when idle, as seen by Figs. 2 and 30.

The pin 321 of each arm is located transversely of and near the end of a plunger rod 330, the upper end of which is flattened, as at 331, to permit the arms 315 to be located at either side of the plunger. The lower, fully rounded part of the plunger is slidably received in the vertical central passage 333 of the block 325. The upper end of the plunger is forked, as shown at 334, and across the fork is a pivot pin 335 upon which is mounted a swinging tail piece or latch 336. In this tail piece is a long slot 338 in which the sleeve 318 moves, the outer end of the slot limiting the downward movement of the arm 315 when the arm is horizontal, as shown in dotted lines in Fig. 30. A lug 339 on the inner end of the latch prevents any backward movement of the arm 315. Located in a bracket 341 extending upward from the bearing block 325 is a dished roller 342 over which the plunger 330 moves, the purpose of which is to support the plunger against the load exerted thereon by the operation of tire stripping.

When the press is fully opened, the several plungers 330 rise simultaneously, by means to be described, to shift the tire stripping arms from the idle position shown in Fig. 2, and in full lines in Fig. 30, to the horizontal position shown in Fig. 22 and in dotted lines in Fig. 30. This upward movement first lifts and tilts the arms as shown and then the upward movement of the several plungers continues, lifting the tire T clear of the diaphragm.

The first phase of the movement is as follows:

The arm being in its lowered and erect position, upward movement of the plunger 330 lifts the arm 315 off its seat, so it is free to rotate about the pivot 321. As the plunger rises, the latch or link 336 rises. As the arm 315 leaves the bearing block, the weight of the upper end immediately causes it to rock to the left, as shown in Fig. 30, about the pivot 321. This rocking movement carries the latch 336 with the arm and the two fall into horizontal position, where the arm 315 is arrested by the sleeve 318 reaching the limit imposed by the sleeve reaching the outer end of the slot 338. This is the horizontal position and at this time the arm has passed beneath the tire, which is now in the position shown in Fig. 17. Continued upward movement of the plungers raises the several arms in unison as has been described.

Retraction of the plungers 330, after the tire is removed, causes all of the arms to return to their lowered position. As they approach their lowered position, the rounded toe 323a at the end of each flat surface 323 restores the arm to its vertical position, which causes the latch to assume erect position, any movement beyond erect position being arrested by the lug 339 on the latch striking the upper end of the plunger.

(b) Stripping arms operating mechanism

Along the side of each plunger 330, and beginning near the upper end thereof, is a long groove 345 in which is mounted a long vertical rack 346, all of the racks facing to the rear of the press. Each bearing block is cut away, as at 347, to expose a portion of the rack and at this point the side of the block is flattened as shown at 348.

The pair of lifting arms at the rear of the press being adjacent, to a flattened surface on each block is secured a bracket 350. A similar bracket is attached to each of the bearing blocks for a front stripping arm. In the case of the rear stripping arms, a short shaft 352 is mounted in the two aligned brackets so that it extends across the two lifting arms. In the case of each front stripping arm, a single bracket 350 is supplied and in this bracket is rotatably mounted one end of a long shaft 354 which extends across the press to a point near the center line of the press, wherein it is rotatably mounted in a bracket 355 secured to one of the vertical frame members. As shown in Fig. 28, the two shafts 354 from the stripping arms at the front of the press meet at about the center line of the press.

Located at each bearing block and mating with its respective rack 346 is a drive pinion 357, the several pinions being keyed to the shafts 352 or 354, as the case may be. It will be seen that if the four pinions 357 are rotated in unison, the four tire stripping arms will rise or fall, going through their operative cycles as has been described.

On the opposed ends of the shafts 354 are keyed sprockets 359, over which are trained two parallel, endless sprocket chains 360 which are held in taut condition by the adjustable turnbuckles 361. These chains pass through openings 362 in the vertical bed plate member. At the rear of the press, the chains 360 are led over two sprockets 363 which are keyed to the projecting end of the shaft 352. At one pair of turnbuckles and attached to the chains, and extending across them, is a block or plate 365, to which is secured the end of a piston rod 366 (Fig. 28). Rod 366 extends into and is operated by fluid pressure in a long cylinder 367, the stroke of the piston being of sufficient extent to operate the tire stripping arms through the driving connections which have been described. The cylinder 367 is secured to the top of an arched supporting block 368, which is in turn mounted on a pedestal 369 at the rear of the bed of the press.

Pressure is admitted to the end of the cylinder 367 to project the rod 366 forwardly to raise the stripping arms by the timing mechanism. The reversal of pressure in the cylinder and the retraction of the rod 366 to lower the arms is by a push button pressed by the operator.

THE TIMING MECHANISM

As explained, the various timers, valves, electrical switches, relays and the like which activate the several instrumentalities are not shown, but the timing mechanism which controls well known devices for the purpose is shown and will be described with reference to the several steps as they occur in the operation. The timing mechanism is shown in Figs. 24 to 27, inclusive. The mechanism is housed in a box or casing 372, which is conveniently located at the rear right hand corner of the frame, as shown in Fig. 5, and secured by bolts 371 to a bed plate 16. This position is over the right hand press head tilting shaft 138. The shape of the box is shown in the several views. It has a main section 373 in which the operating parts are housed and the upper part of which is enclosed by a cover plate 374. At one side it has a raised ledge 375 on which the several micro switches which control the operation of the accessories are mounted, and over this ledge is the removable cover 376. At the location shown in Fig. 25, on the ledge 375, is secured a bracket 378 which overhangs the space in the box.

Rotatably mounted in the bracket 378 and in bearings 379 in the ends of the box are two separate aligned shafts 380 and 381. The shorter of the shafts, 380, which is at the left of Fig. 25, controls the operations of the press during the tilting movement, while the longer shaft 381 controls the operations of the press during the vertical movement.

To the shaft 380 is fixed a sprocket 382 over which is trained a chain 384 by which the shaft is driven from a sprocket 385 on the shaft 138. At the inner end of the shaft 381 is fixed a gear 386 which meshes with a pinion 387 fixed to the hub of a sprocket 388. The sprocket is carried on a shaft 389 at one lower corner of a frame composed of a pair of triangular plates 390, which depend from a central hub 391 on the shaft 381 at the upper corner of the frame. A pin 392 at the other corner holds the frame together. The frame is held in any position of angular adjustment below the shaft by a rod 393, one end of which passes over the pin 392 and the other end of which is threaded and projects through an opening 394 in the side of the box where it is held by a lock nut 395.

Over the sprocket 388 is trained the chain 398 which drives the shaft 381 from a sprocket 399 on the shaft 86 in the train of gearing which imparts the vertical movement to the press head. The driving mechanism for the shafts 380 and 381 is calculated so as to rotate each shaft for approximately one revolution for each arc of movement of the respective shafts from which the power is derived.

Fixed to the shaft 380 are two cams, the one to the left being given the numeral 400 and the one to the right the numeral 401. The bodies of each of these cams are the same, each having a hub portion 402 and an outer rim 403 with overhanging edges as shown in Fig. 25. This construction provides for the mounting of different types of cam members thereon and is designed to give a wide latitude to the operation of the several cams. In the case of the cam 400, two ring-shaped disks 405 are mounted on the perimeter of the cam and are held by two side rings 406 through which securing bolts 407 are passed. The disks 405 are oppositely positioned and on the rims of the disks are registering notches 409. In the plane of this disk and secured to the ledge 375 is a micro switch 410 which has a spring pressed roller 411 bearing upon the rims of the cam disks. As the cam rotates to bring the roller 411 into engagement with the notch 409, the switch 410, through electrical connections not shown, operates the valve by which the low pressure steam is admitted to the diaphragm. This operation takes place after the diaphragm has been given its preliminary contraction, but before the end of the tilting movement, as shown in the diagram Fig. 33. It is possible to shift the exact point where this steam admission takes place by shifting the cam disks around the periphery of the cam 400.

The cam 401 is of a different type although the body thereof is the same as that of cam 400. This cam is shown in Fig. 27. In this case, the cam disks are replaced by individual cam lugs, one of which, 414, is fastened to the left hand side of the cam 401, and the other, 415, to the right hand side of the cam. The construction of these cams is repeated on the shaft 381 and reference is made to Fig. 27, which shows the common construction. Each cam member or lug is a projection 415a extending outwardly from an arcuate shoe 415b, which fits over the rim of the cam body and is held in place by a bolt 415c passing through the cam body. In the illustration shown in Fig. 25, the two cam members 414 and 415 are shown in register on opposite sides of the cam 401 and this illustration is chosen for the sake of simplifying the drawing. In actual practice, the two cam members 414 and 415 are angularly spaced for the following reason.

The micro-switch 416, the roller 417 of which is in the path of the cam member 414, is the means which controls the open limit switch which stops the press at the end of the opening movement. When the operator presses the starting button, the tilting motor is started in operation momentarily until the roller 417 passes off the cam member 414 and this holds the circuit until the vertical motor 10 takes over. At the end of the opening movement, the cam member 414 stops the press. At the proper time during the tilting movements, the cam 250 will lower the upper diaphragm ring to take care of the preliminary contraction to the diaphragm.

The micro switch 418, the roller 419 of which is in the path of the cam member 415, controls a transfer switch by which the power is shut off from the motor 8 at the end of the tilting movement and transfers the power to the motor 10. This also arrests the rotation of the shaft 380 and starts shaft 381 in operation.

Fixed to the shaft 381 are four cams which, from left to right, are given the reference numerals 420, 421, 422 and 423. The first three of these cams are similar to cam 401, while cam 423 is similar to cam 400.

On the left side of cam 420 is the cam lug 425 in the path of which is the roller 426 of the micro-switch 427. This is the closing limit switch which, when actuated by the cam member 425, stops the closing of the press and, at the same time, starts the main timer which controls the cycle during which the press is closed and the cure is taking place. When the cycle is completed, the timer reverses the vertical motor and starts it in operation to open the press, at the same time operating the valve to cut off the curing steam, and opens the diaphragm to the vacuum.

On the right hand side of the cam 420 and in alignment therewith is a second cam member 428 in the path of which is the roller 429 of the micro-switch 430. This is the switch which controls the transfer switch by which the power (in reverse) is connected to the tilting motor to complete the opening of the press after the vertical upward movement has ceased.

On the cam 421 is a single cam lug 432 in the path of which is the roller 433 of a micro-switch 434. This is the switch which, during opening of the press, moves a valve to admit fluid pressure to one side of the cylinder 300, which raises the bead ring assembly to lift the tire out of the lower mold section. This cam member is set so that the tire lifting takes place when the upper press head has lifted about fifteen inches.

The cam 422 has a single cam member 435 in the path of which is the roller 436 of a micro-switch 436a. This is the switch which controls the momentary delay during the lowering of the press head, as shown in Fig. 33, to permit the escape of air from between the diaphragm and the tire and to allow the fabric to turn about the head. The delay limit switch also starts two auxiliary timers, one of which controls the period that the motor 10 is out of operation. The other timer opens the valve which admits the high pressure steam to the diaphragm, which is subsequently shut off just before or at the end of the main cycle timer operation.

The cam 423 is in register with the roller 437 of a micro-switch 438. When the roller 437 drops into the notch on this cam, the valve is closed, shutting off the low pressure steam from the diaphragm, and this occurs just after the press has resumed its closing movement following the delay period.

The above takes care of all of the operations except the actual stripping of the diaphragm from the tire and the elevation of the tire stripping arms. These operations take place at the end of the full open movement and are controlled by the open limit micro-switch 416. This switch not only stops the tilting motor 8, but through suitable electrical connections (not shown) also performs the following operations: (1) Pressure is admitted to the rear of the cylinder 367 operating the tire-stripping arms, this pressure continuing against the resistance of the diaphragm until the tire is completely stripped and in elevated position. (2) The pressure in the cylinder 300 is reversed, causing the lower diaphragm ring to return to its seat in the lower mold section. (3) A valve is opened which admits pressure to the cylinder 215, which raises the piston 220—224 to its full extent, bringing the diaphragm to its fully extend condition. It will be noted that during the upward tilting movement, the cam 250 has lifted the cylinder 215 to its raised position so that when the diaphragm is extended by fluid pressure admitted to the cylinder 215, the upper diaphragm ring is in the position shown in Figs. 19 and 22.

Two additional micro-switches are shown adjacent the cams 421 and 422, which have not been described. These are provided as spares in case the tire manufacturer may have variations in the vulcanizing procedure which can be controlled by cam members added to the cams 421 and 422.

This completes the automatic operation of the press. The operator must, however, press another button, which reverses the pressure in the cylinder 367 and lowers the tire stripping arms. It may be desirable to provide a safety switch in a control circuit which is opened when the tire stripping arms reach their upper limit, in order to prevent any press operation if the arms are raised. The switch will close as the arms are lowered. Any moving part connected with the stripping arms may be availed of to operate such a safety switch.

MOTOR INTERLOCKING MECHANISM

Under ordinary circumstances, the micro switches which control the transfer of power from the tilting motor 8 to the vertical motor 10, and then back to the tilting motor and the limit switches to arrest the motors, will function properly, but in order to insure against accidents should these switches fail to operate, a mechanical interlocking means has been devised to insure that neither motor will interfere with the operation of the other. This will also prevent any motor from overrunning. This mechanism is shown in Fig. 24, which shows the condition of the parts when the press is fully opened, with the upper mold section at the backward tilted position.

Welded to the shaft 76, which imparts the vertical movement to the press head, is a disk 442 in the edge of which is cut a deep notch 443. The shaft is at the position it occupies when the mold is at the top of its vertical movement and during the tilting operation, it being understood that when the mold section 2 is rising the shaft is moving in clockwise direction, while in closing the shaft is moving counterclockwise. At the side of and beyond the notch 443 is an outwardly projecting cam 444, and opposite the notch is a second outwardly projecting cam 445.

Located in the interior of the bed of the press is a swinging link 447 which is supported at the end near the shaft 76 on a swinging hanger 446 depending from a bracket 449 secured to the underside of the bed plate 15. The right hand end of link 447 has a roller 448 which rides over the edge of the disk 442 and when the mold section 2 is at the top of its vertical movement seats in the recess 443. At this point, the tilting motor will take over and this position of the link 447 closes the circuit to that motor and breaks the circuit to the vertical motor, as will be explained. Should, however, the vertical motor overrun and the mold section 2 start downwardly, the roller 448 will ride up the cam 444 and the current to the vertical motor will be shut off. Should the motor 10 overrun on its closing movement, the movable mold section would start to rise and, at this moment, the roller 448 will start to ride up the cam 445; this will break the circuit to the vertical motor before the mold has opened appreciably. Any opening movement beyond this point will create a dangerous condition for it would permit the steam, which is under high pressure within the diaphragm, to blow out the diaphragm and the band.

On a plate 452, which is attached at its upper end to the underside of the bed plate 16 and at its lower end to the stationary shaft 257, are located two circuit breakers. The upper is given the numeral 453 and is a circuit breaker for the vertical motor 10. The lower is given the numeral 454 and is the circuit breaker for the tilting motor 8.

On the operative shaft of the circuit breaker 454 is a T-shaped lever 455. In the position shown, the circuit to the tilting motor is closed so that it may take over at the top of the vertical movement of the mold section 2. To one arm of the lever 455, at the point 456, the far end of the link 447 is pivoted. To another arm is attached the upper end of a coil spring 457, the lower end of which is anchored to the plate 452. This spring urges the lever 455 toward the position shown and also presses the roller 448 against the edge of the cam disk 442.

The third arm of the lever 455 supports a swiveled pin 459, through which is slidable a rod 460 on the lower end of which is fixed a stop collar 461. The upper end of rod 460 is passed through a swiveled pin 463 and on its upper threaded end are two adjustable stop nuts 464. Pin 463 is mounted on the end of one arm of a T-shaped lever 465 which is fixed to the operating shaft of the circuit breaker 453 for the vertical motor 10. At the end of a second arm on the lever 465 is a roller 466, which rides on the edge of a disk 468 keyed to the shaft 138 which imparts the tilt to the press head. A spring 469 attached to the third arm of the lever 465 and anchored at its lower end in the plate 452 urges the roller 466 against the edge of the cam disk 468. The edge of the disk 468 is formed with a deep notch 470.

In the position of the roller 466 shown in Fig. 24, the upper mold has moved to its fully tilted position, the shaft 138 having moved in a counterclockwise direction during this movement. In closing, the shaft moves in clockwise direction, which brings the roller 466 into the notch 470. This movement closes the circuit to the vertical motor which now takes over and the movement of the link 447 to the left, due to the roller 448 leaving the notch 443, breaks the circuit to the tilting motor. As soon, however, as the mold section 2 reaches the top of its vertical movement, the passing of the roller 448 in the notch 443 closes the circuit to the tilting motor, and as soon as the tilting motor starts to operate the roller 466 will leave the notch 470 and the circuit to the vertical motor will be broken.

It will be seen, therefore, that a complete interlocking mechanism has been devised to prevent the two motors operating at the same time.

The mechanism for preventing the overrunning of the vertical motor at either end of its travel is operated by the cam 444 or 445, as the case may be. In either case, as the roller 448 rides up on a cam, the link 447 will be shifted to the left beyond the extent of the normal shift due to the roller riding on the edge of the disk 442. During the normal operation, the pin 459 moves idly over the smooth surface of the rod 460, but should the excess movement be imparted to the link, the pin 459 will strike the stop collar 461 and this will, through the rod 460, rock the upper end of lever 465 to the left and restore the lever 465 to the position which is shown in Fig. 24, thus breaking the circuit to the vertical motor.

OPERATION

It is believed that the operation of the press will have been understood from the foregoing description. The press has advantages over the presses shown in applicant's prior patents and application in the shaping and curing of tires of large cross section which have very large band widths. The press is very flexible in its operation and may be adjusted for a great variety of band sizes. Its maintenance and upkeep is very low, especially in view of the operative advantages and the large range of tire sizes which it will shape and cure. The stripping operation which raises the tire from the diaphragm is improved over the prior patents and application.

What is claimed is:

1. In a press for shaping drum built tire bands and vulcanizing them in tire form, the combination of upper and lower mold sections, one of which is movable toward and from the other, a diaphragm located between the mold section, diaphragm closures at the ends of the diaphragm, means to cause the diaphragm closures to approach during the closing of the press, a pivotal mounting, a vertical guiding means for the movable mold section on said pivotal mounting, and means for moving the movable mold section in two stages during the closing of the press, the first of said stages being a rocking movement about the pivotal mounting from a fully open position in which the movable mold section is wholly at one side of the diaphragm to a position in vertical alignment and parallel with the other mold section, the second stage of movement being along the vertical guiding means to bring the two mold sections in contact.

2. In a press for shaping drum built tire bands and vulcanizing them in tire form comprising the combination of a movable upper mold section and a stationary lower mold section, a diaphragm located between the mold sections, diaphragm rings closing the ends of the diaphragm, means to cause the diaphragm rings to approach during the closing of the press, a pivotal mounting, a vertical guiding means for the movable mold section on said pivotal mounting, means to rock the upper mold section about its pivotal mounting from a position wholly at one side of the diaphragm to a position over the lower mold section in parallelism therewith and thereafter to lower the upper mold section in a straight line along the vertical guiding means to bring the mold sections in contact while maintaining the mold sections in parallelism.

3. In a press for shaping drum built tire bands and vulcanizing them in tire form, the combination of upper and lower mold sections, one of which is movable toward and from the other, a diaphragm between the mold sections, diaphragm closures at the ends of the diaphragm, a vertical guide for the movable mold section and a pivotal mounting for said guide, power means to rock the movable mold section about its pivotal mounting to move it from a position wholly at one side of the diaphragm to a position in register with and parallel to the other mold section but spaced therefrom, and a second power means operative thereafter to move the movable mold section along the vertical guide to bring the mold sections in contact.

4. In a press for shaping drum built tire bands and vulcanizing them in tire form, the combination of upper and lower mold sections, one of which is movable toward and from the other, a diaphragm between the mold sections, diaphragm closures at the ends of the diaphragm, a vertical guide for the movable mold section and a pivotal mounting for said guide, power means to rock the movable mold section about its pivotal mounting to move it from a position wholly at one side of the diaphragm to a position in register with and parallel to the other mold section but spaced therefrom, a second power means operative thereafter to move the movable mold section along the vertical guide to bring the mold sections in contact, and means for stopping each of said power means during the operation of the other.

5. In a press for shaping and curing flat tire bands into tire form, a lower mold and an upper mold, a band shaping diaphragm located centrally of the lower mold and projecting into the space between the molds, a guideway in the press, a pivot for the guideway, a carriage movable along the guideway, means to hold the guideway in vertical position or to rock it about the pivot to a substantially horizontal position, a support for the upper mold on the carriage and means to move the carriage in the guideway while it is in vertical position to cause the molds to approach or recede while maintained in parallelism.

6. In a press for shaping and curing flat tire bands into tire form, a lower mold and an upper mold, a band shaping diaphragm located centrally of the stationary mold and projecting into the space between the molds, a guideway in the press, a pivot for the guideway, a carriage movable along the guideway, means to hold the guideway in vertical position and to rock it about the pivot to a substantially horizontal position, a support for the upper mold on the carriage and means to move the carriage in the guideway while it is in vertical position to cause the molds to approach or recede while maintained in parallelism, upper and lower diaphragm supporting rings in the ends of the diaphragm, and means to cause the rings to approach during the approach of the molds, said last named means including mating formations on the upper mold and the upper diaphragm ring.

7. In a press for shaping and curing flat tire bands into tire form, a lower mold and an upper mold, a band shaping diaphragm located centrally of the lower mold and projecting into the space between the molds, a guideway in the press, a pivot for the guideway, a carriage movable along the guideway, means to hold the guideway in vertical position and to rock it about the pivot to a substantially horizontal position, a support for the upper mold on the carriage and means to move the carriage in the guideway while it is in vertical position to cause the molds to approach or recede while maintained in parallelism, upper and lower diaphragm supporting rings in the ends of the diaphragm, and means to cause the rings to approach during the approach of the molds, said last named means comprising mechanism connected with the upper diaphragm ring to cause a preliminary lowering thereof and mating formations on the movable mold and the upper diaphragm ring.

8. In a press for shaping and curing pneumatic tires comprising a lower mold and a movable upper mold, a guideway on the press, a pivot for the guideway, a carriage to which the upper mold is attached, said carriage being movable along the guideway, means to hold the guideway in vertical position with the two molds in register, means to move the carriage in the guideway while the guideway is held in vertical position to cause the molds to approach or recede while in parallelism, and means to rock the guideway about its pivot when the upper mold is at the top of its vertical movement on the guideway to cause the upper mold to clear the vertical space above the lower mold.

9. In a press for shaping and curing pneumatic tires comprising a lower mold and a movable upper mold, a guideway on the press, a horizontal pivot for the guideway, a carriage to which the upper mold is secured, said carriage being movable along the guideway, means to hold the guideway in a vertical position with the two molds in register, means to move the carriage in the guideway while the guideway is held in vertical position to cause the molds to approach or recede while in parallelism, and means to rock the guideway about its pivot through approximately ninety degrees, when the upper mold is at the top of its vertical movement.

10. In a press for shaping and curing pneumatic tires comprising a stationary lower mold and a movable upper mold, a guideway on the press, a pivot for the guideway, a carriage to which the upper mold is attached, said carriage being movable along the guideway, means to hold the guideway in vertical position with the two molds in register, means to move the carriage in the guideway while the guideway is held in vertical position to cause the molds to approach or recede while in parallelism, and means to rock the guideway about its pivot when the upper mold is at the top of its vertical movement on the guideway to cause the upper mold to clear the vertical space above the lower mold, a motor to rock the guideway about its pivot, a second motor to move the carriage in the guideway, and means to operate said motors sequentially.

11. In a press for shaping and curing pneumatic tires comprising a stationary lower mold and a movable upper mold, a guideway on the press, a horizontal pivot for the guideway, a carriage to which the upper mold is secured, said carriage being movable along the guideway, means to hold the guideway in a vertical position with the two molds in register, means to move the carriage in the guideway while the guideway is held in vertical position to cause the molds to approach or recede while in parallelism, means to rock the guideway about its pivot through approximately ninety degrees when the upper mold is at the top of its vertical movement, a motor to rock the guideway about its pivot, a second motor to move the carriage in the guideway, and means to operate said motors sequentially.

12. In a press for shaping and curing pneumatic tires comprising a stationary lower mold and a movable upper mold, a guideway on the press, a pivot for the guideway, a carriage to which the upper mold is attached, said carriage being movable along the guideway, means to hold the guideway in vertical position with the two molds in register, means to move the carriage in the guideway while the guideway is held in vertical position to cause the molds to approach or recede while in parallelism, means to rock the guideway about its pivot when the upper mold is at the top of its vertical movement on the guideway to cause the upper mold to clear the vertical space above the lower mold, a shaping and curing diaphragm located centrally of the lower mold, upper and lower rings at the ends of the diaphragm, and yielding means to hold the upper ring of the diaphragm between the molds and in the path of the upper mold while the molds are in spaced parallelism.

13. In a press for shaping and curing pneumatic tires comprising a stationary lower mold and a movable upper mold, a guideway on the press, a horizontal pivot for the guideway, a carriage to which the upper mold is secured, said carriage being movable along the guideway, means to hold the guideway in a vertical position with the two molds in register, means to move the carriage in the guideway while the guideway is held in vertical position to cause the molds to approach or recede while in parallelism, means to rock the guideway about its pivot through approximately ninety degrees when the upper mold is at the top of its vertical movement, a shaping and curing diaphragm located centrally of the lower mold, upper and lower rings at the ends of the diaphragm, and yielding means to hold the upper ring of the diaphragm between the molds and in the path of the upper mold while the molds are in spaced parallelism.

14. In a press for shaping and curing tire bands, said press having a diaphragm, upper and lower rings at the ends of the diaphragm, said diaphragm adapted to have a tire band telescoped thereover, said band being of lesser height than the height of the diaphragm in fully extended condition, a lower mold section and an upper mold section, means for moving the upper mold section toward the lower mold section and into contact with the upper edge of the band while the mold sections are in parallelism to shape the band, said upper mold section contacting the upper diaphragm ring during closing of the press, means operative before the contact of the upper mold section and the upper ring to lower the upper ring to a position in approximately the plane of the upper edge of the band, means to delay the approach of the mold sections after the upper mold section has partially closed and the diaphragm and the band are partially shaped to permit the escape of air entrapped between the diaphragm and the tire band and to allow the fabric to rotate about the beads, and means operative thereafter to cause the mold sections to contact about the fully shaped band.

15. In a press for shaping and curing tire bands having relatively deep beaded edges, said press having a diaphragm which when extended projects above the upper edge of the band, two mold sections in the press, means for moving the mold sections toward one another in the closing of the press, the diaphragm and the band being in the path of a movable mold section, said movable mold section operating to contract the diaphragm and the band during closing movement of the press, means to impart a preliminary contraction to the diaphragm before the movable mold section contacts therewith to bring the upper edge of the diaphragm in register with the upper bead of the band, means operative during the preliminary contraction to the diaphragm to introduce fluid pressure into the diaphragm, and means operative during the subsequent shaping of the diaphragm and band while the diaphragm and band are partially shaped to retard the approach of the mold sections to a sufficient extent to permit the escape of air trapped between the band and the diaphragm.

16. In a press for shaping tire bands and vulcanizing them in tire form, relatively movable upper and lower mold sections, means to move the mold sections relatively during the closing and opening of the press, a shaping and curing diaphragm between the mold sections, means to deform the diaphragm during the closing of the press to shape the tire, means operative after the tire is cured to strip the cured tire from the mold sections and to extend the diaphragm and extract it from the tire, said means including a stripping arm movable to a position beneath the tire after it is stripped from the lower mold section, and means operative thereafter to lift the arm vertically in the direction of the axis of the mold to raise the tire to the top of the diaphragm.

17. In a press for shaping tire bands and vulcanizing them in tire form, relatively movable upper and lower mold sections, means to move the mold sections relatively during the closing and opening of the press, a shaping and curing diaphragm between the mold sections, means to deform the diaphragm during the closing of the press to shape the tire, means operative after the tire is cured to strip the cured tire from the mold sections and to extend the diaphragm and extract it from the tire, said means including a stripping arm movable to a position beneath the tire after it is stripped from the lower mold section, means operative thereafter to lift the arm vertically in the direction of the axis of the mold to raise the tire to the top of the diaphragm, a shiftable support for the upper mold section, and means to shift said support to move the upper mold section out of the path of the tire at the end of the press opening movement.

18. In a press for shaping tire bands and vulcanizing them in tire form, relatively movable upper and lower mold sections, means to move the mold sections relatively during the opening and closing of the press, a shaping and curing diaphragm between the mold sections, upper and lower rings at the edges of the diaphragm, means operative during the opening of the press to lift the tire from the lower mold section, means movable beneath the tire to engage the tire and raise it in a path parallel to the axis of the diaphragm, said tire engaging means comprising arms, means to impart to said arms a pivotal movement to bring them beneath the tire and followed by a vertical movement in a direction parallel to the axis of the tire, and means to separate the rings to strip the diaphragm from the interior of the tire.

19. In a press for shaping tire bands and vulcanizing them in tire form, relatively movable upper and lower mold sections, means to move the mold sections relatively during the opening and closing of the press, a shaping and curing diaphragm between the mold sections, upper and lower rings at the edges of the diaphragm, means operative during the opening of the press to lift the tire from the lower mold sections, means movable beneath the tire to engage the tire and raise it in a path parallel to the axis of the diaphragm, said tire engaging means comprising arms, means to impart to said arms a pivotal movement to bring them beneath the tire and followed by a vertical movement in a direction parallel to the axis of the tire, and means to separate the rings to strip the diaphragm from the interior of the tire.

20. In a press for shaping tire bands and vulcanizing them in tire form, relatively movable upper and lower mold sections, means to move the mold sections relatively during the opening and closing of the press, a shaping and curing diaphragm between the mold sections, upper and lower rings at the edges of the diaphragm, means operative during the opening of the press to lift the tire from the lower mold section, means movable beneath the tire to engage the tire and raise it in a path parallel to the axis of the diaphragm, said tire engaging means comprising arms, means to impart to said arms a pivotal movement to bring them beneath the tire and followed by a vertical movement in a direction parallel to the axis of the tire, and means to move the rings in opposite directions.

21. In a press for shaping and curing flat tire bands into tire form, a lower mold and a movable upper mold, means to move the upper mold toward and from the lower mold, a band shaping diaphragm located centrally of the lower mold, upper and lower diaphragm rings secured to the upper and lower edges of the diaphragm, a piston rod attached at its upper end to the upper diaphragm ring, a cylinder for said piston rod movable axially through the lower mold, links attached to the lower diaphragm ring, a lever connected to said links, means actuated during the opening of the press to operate the lever first to lift the lower diaphragm ring and the tire out of the lower mold and then to return the lower diaphragm ring, and means to admit fluid pressure to the cylinder to raise the upper diaphragm ring to complete the stripping of the diaphragm from the tire.

22. In a press for shaping and curing flat tire bands into tire form, a lower mold and a movable upper mold, means to move the upper mold toward and from the lower mold, a band shaping diaphragm located centrally of the lower mold, upper and lower diaphragm rings secured to the upper and lower edges of the diaphragm, a piston rod attached at its upper end to the upper diaphragm ring, a cylinder for said piston rod movable axially through the lower mold, links attached to the lower diaphragm ring, a lever connected to said links, means actuated during the opening of the press to operate the lever first to lift the lower diaphragm ring and the tire out of the lower mold and then to return the lower diaphragm ring, tire supporting arms movable beneath the tire before the return of the lower diaphragm ring, and means to admit fluid pressure to the cylinder to raise the upper diaphragm ring to complete the stripping of the diaphragm from the tire.

23. A press in accordance with claim 21 having means actuated during the opening and closing of the press to shift the cylinder independently of the lower diaphragm ring to alter the distance between the two diaphragm rings.

24. A press for shaping and curing flat tire bands into tire form comprising a stationary lower mold and a movable upper mold, a pivoted support for the upper mold, means to rock the support to bring the upper mold into spaced parallelism with the lower mold, a guideway on the support and movable therewith, and means acting after the upper mold is parallel to the lower mold to move the upper mold along the guideway while maintained in parallelism with the lower mold until the two molds are in contact.

25. A press for shaping and curing flat tire bands into tire form comprising a stationary lower mold and a movable upper mold, a pivoted support for the upper mold, means to rock the support to bring the upper mold into spaced parallelism with the lower mold, a guideway on the support and movable therewith, and means acting after the upper mold is parallel to the lower mold to move the upper mold along the guideway while maintained in parallelism with the lower mold until the two molds are in contact, said last named means comprising a toggle and means to straighten the toggle to exert pressure on the molds at the end of the press closing movement.

26. A press for shaping and curing flat tire bands into tire form comprising a stationary lower mold and a movable upper mold, a pivoted support for the upper mold, means to rock the support to bring the upper mold into spaced parallelism with the lower mold, a guideway on the support and movable therewith, and means acting after the upper mold is parallel to the lower mold to move the upper mold along the guideway while maintained in parallelism with the lower mold until the two molds are in contact, said last named means comprising a toggle, means to straighten the toggle to exert pressure on the molds at the end of the press closing movement, and separate power means to rock the support and to actuate the toggle.

27. A press for shaping and curing tire bands having beaded edges, said press having relatively movable mold sections, means to move the mold sections toward each other and in contact with both edges of the band to shape the band while maintaining the mold sections in parallelism, means for supporting the band in position so that both edges are contacted by the mold sections during the shaping operation, means to exert fluid pressure on the band to assist in shaping it, and mechanism operative after both edges of the band have been contacted by the mold sections and while the band is partially shaped to retard the approach of the mold sections to a sufficient extent to allow the fabric to rotate in the beaded edges to its new position and thereafter to cause the mold section moving means to resume its closing movement.

28. A press for shaping and curing tire bands having beaded edges, said press having relatively movable mold sections, means to move the mold sections toward each other and in contact with both edges of the band to shape the band while maintaining the mold sections in parallelism, a diaphragm located between the mold sections, means for supporting the band in position around the diaphragm so that both edges of the band are contacted by the mold sections during the shaping operation, means to admit fluid pressure to the diaphragm to assist in shaping the band, and mechanism operative after both edges of the band have been contacted by the mold sections and while the band is partially shaped to retard the aproach of the mold sections to a sufficient extent to enable air entrapped between the band and the diaphragm to escape and thereafter to cause the mold moving means to resume its closing movement.

29. A press for shaping and curing tire bands having beaded edges, said press having relatively movable mold sections, means to move the mold sections toward each other and in contact with both edges of the band to shape the band while maintaining the mold sections in parallelism, means for supporting the band in position so that both edges are contacted by the mold sections during the shaping operation, means to exert fluid pressure on the band to assist in shaping it, and a timing device operative after both edges of the band have been contacted by the mold sections and while the band is partially shaped to retard the approach of the mold sections to a sufficient extent to allow the fabric to rotate in the beaded edges to its new position and thereafter to cause the mold section moving means to resume its closing movement.

30. A press for shaping and curing tire bands having beaded edges, said press having relatively movable mold sections, means to move the mold sections toward each other and in contact with both edges of the band to shape the band while maintaining the mold sections in parallelism, a diaphragm located between the mold sections, means for supporting the band in position around the diaphragm so that both edges of the band are contacted by the mold sections during the shaping operation, means to admit fluid pressure to the diaphragm to assist in shaping the band, and a timing device operative after both edges of the band have been contacted by the mold sections and while the band is partially shaped to retard the approach of the mold sections to a sufficient extent to enable air entrapped between the band and the diaphragm to escape and thereafter to cause the mold moving means to resume its closing movement.

References Cited in the file of this patent

UNITED STATES PATENTS

| | | |
|---|---|---|
| 1,276,411 | Price | Aug. 20, 1918 |
| 2,027,165 | Grubman | Jan. 7, 1935 |
| 2,243,532 | Maynard | May 27, 1941 |
| 2,296,800 | Soderquist | Sept. 22, 1942 |
| 2,495,663 | Soderquist | Jan. 24, 1950 |
| 2,495,664 | Soderquist | Jan. 24, 1950 |

OTHER REFERENCES

Marks Mechanical Engineers Handbook, 4th ed. 1941, McGraw-Hill Book Co., Inc., New York & London, pages 889 and 1008.